US011937336B2

(12) United States Patent
Cao et al.

(10) Patent No.: US 11,937,336 B2
(45) Date of Patent: Mar. 19, 2024

(54) SIGNALING TRANSMISSION INTERFACE COMPATIBILITY METHOD AND APPARATUS

(71) Applicant: Huawei Technologies Co., Ltd., Shenzhen (CN)

(72) Inventors: Longyu Cao, Shanghai (CN); Yijun Yu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 319 days.

(21) Appl. No.: 17/197,546

(22) Filed: Mar. 10, 2021

(65) Prior Publication Data

US 2021/0195401 A1 Jun. 24, 2021

Related U.S. Application Data

(63) Continuation of application No. PCT/CN2019/105388, filed on Sep. 11, 2019.

(30) Foreign Application Priority Data

Sep. 17, 2018 (CN) .......................... 201811083183.2

(51) Int. Cl.
H04W 8/14 (2009.01)
H04W 48/16 (2009.01)
(Continued)

(52) U.S. Cl.
CPC ............. *H04W 8/14* (2013.01); *H04W 48/16* (2013.01); *H04W 76/11* (2018.02); *H04W 76/27* (2018.02); *H04W 92/20* (2013.01)

(58) Field of Classification Search
CPC ....... H04W 8/14; H04W 48/16; H04W 76/11; H04W 76/27; H04W 92/20
See application file for complete search history.

(56) References Cited

U.S. PATENT DOCUMENTS

2018/0092157 A1 3/2018 Chen
2022/0103292 A1* 3/2022 Hwang ................. H04L 1/1812

FOREIGN PATENT DOCUMENTS

CN 103945352 A 7/2014
CN 105519230 A 4/2016
(Continued)

OTHER PUBLICATIONS

"3rd Generation Partnership Project; Technical Specification Group Services and System Aspects; Procedures for the 5G System; Stage 2 (Release 15)", 3GPP TS 23.502 V15.2.0, Technical Specification, Jun. 2018, 308 Pages.

(Continued)

*Primary Examiner* — Diane D Mizrahi
(74) *Attorney, Agent, or Firm* — Slater Matsil, LLP

(57) ABSTRACT

This application provides a signaling transmission interface compatibility method and apparatus. The method includes: A first network element obtains capability information of an access and mobility management function network element, where the capability information is used to indicate that the access and mobility management function network element has a capability of performing signaling transmission with a radio access network through a target interface function network element. The first network element selects the target interface function network element based on the capability information, where the target interface function network element is used for signaling transmission between the access and mobility management function network element and the radio access network. Therefore, according to the technical solutions provided in this application, the first network element obtains the capability information of the access and mobility management function network element, and selects the corresponding target interface function network element based on the capability information.

17 Claims, 26 Drawing Sheets

(51) Int. Cl.
  *H04W 76/11*  (2018.01)
  *H04W 76/27*  (2018.01)
  *H04W 92/20*  (2009.01)

(56) References Cited

FOREIGN PATENT DOCUMENTS

| CN | 107852407 A | 3/2018 |
|---|---|---|
| CN | 108207010 A | 6/2018 |
| EP | 3493648 A1 | 6/2019 |
| WO | 2018021861 A1 | 2/2018 |
| WO | 2018085784 A1 | 5/2018 |

OTHER PUBLICATIONS

Huawei, UE History Information introduction NG, 3GPP TSG-RAN3 Meeting #100, Busan, Korea, May 21-25, 2018, R3-183263, 57 pages.

3GPP TS 29.274 V15.4.0 (Jun. 2018), 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3(Release 15), 386 pages.

* cited by examiner

SIGNALING TRANSMISSION INTERFACE COMPATIBILITY METHOD AND APPARATUS

CROSS-REFERENCE TO RELATED APPLICATIONS

This application is a continuation of International Application No. PCT/CN2019/105388, filed on Sep. 11, 2019, which claims priority to Chinese Patent Application No. 201811083183.2, filed on Sep. 17, 2018. The disclosures of the aforementioned applications are hereby incorporated by reference in their entireties.

TECHNICAL FIELD

This application relates to the field of communications technologies, and in particular, to a signaling transmission interface compatibility method and apparatus.

BACKGROUND

The 3rd Generation Partnership Project (3GPP) standard defines a service-oriented architecture of a core network in the 5-th generation (5G) communication. A control-plane function of the 5G core network is divided into a plurality of network functions (NFs), and signaling transmission is performed between network functions through a service-oriented interface. In addition, the 3GPP standard also defines: Signaling transmission is performed between an access and mobility management function (AMF) network element of the 5G core network and a radio access network (RAN) through a non-service-oriented interface that is based on a next generation (NG) application protocol (NGAP) protocol.

At present, communication protocol processing between the core network and the radio access network is relatively complex. As a result, signaling transmission efficiency is low, causing a relatively high signaling transmission delay, and even signaling transmission cannot be properly performed.

SUMMARY

This application provides a signaling transmission interface compatibility method and apparatus, to resolve a problem that because communication protocol processing between a core network and a radio access network is relatively complex, signaling transmission efficiency is low, and even signaling transmission cannot be properly performed.

According to a first aspect, this application provides a signaling transmission interface compatibility method, including: a first network element obtains capability information of an access and mobility management function network element (for example, an AMF network element), where the capability information is used to indicate that the access and mobility management function network element has a capability of performing signaling transmission with a radio access network through a target interface function network element. The first network element selects the target interface function network element based on the capability information, where the target interface function network element is used for signaling transmission between the access and mobility management function network element and the radio access network.

According to the method, the first network element obtains the capability information of the access and mobility management function network element, and selects the corresponding target interface function network element based on the capability information. In this way, the first network element can perform signaling transmission with the access and mobility management function network element of a core network through the target interface function network element, thereby ensuring that signaling transmission can be properly performed between the radio access network and the core network.

With reference to the first aspect, in a first possible implementation of the first aspect, that a first network element obtains capability information of an access and mobility management function network element includes: The first network element sends request information to a second network element; and the first network element receives the capability information from the second network element. In this case, the first network element obtains the capability information of the access and mobility management function network element from the second network element. In this way, the first network element can select the target interface function network element based on the capability information, and perform signaling transmission with the access and mobility management function network element of the core network through the target interface function network element, thereby ensuring that signaling transmission can be properly performed between the radio access network and the core network.

With reference to the first aspect, in a second possible implementation of the first aspect, that a first network element obtains capability information of an access and mobility management function network element includes: The first network element sends request information to a second network element; the first network element receives identification information of the mobility management function network element from the second network element; and the first network element obtains the capability information from the first network element based on the identification information. In this case, the first network element obtains the capability information of the access and mobility management function network element from the first network element. In this way, the first network element can select the corresponding target interface function network element based on the capability information, and perform signaling transmission with the access and mobility management function network element through the target interface function network element, thereby ensuring that signaling transmission can be properly performed between the first network element and the mobility management function network element.

With reference to the first aspect, in a third possible implementation of the first aspect, that a first network element obtains capability information of an access and mobility management function network element includes: The first network element sends request information to a second network element; the first network element receives identification information of the mobility management function network element from the second network element; the first network element sends the identification information to a third network element; and the first network element receives the capability information from the third network element. In this case, the first network element obtains the capability information of the access and mobility management function network element from the third network element. In this way, the first network element can select the target interface function network element based on the capability information, and perform signaling transmission with the access and mobility management function network element through the target interface function network element, thereby ensuring that signaling transmission can be properly performed between the radio access network and the core network.

With reference to the third possible implementation of the first aspect, in a fourth possible implementation of the first aspect, the first network element is a radio network management function network element (for example, a radio network management function (RNMF) element), and the third network element is a non-service-oriented interface function network element (for example, an N2 interface function network element). Alternatively, the first network element is a radio resource control network element (for example, a radio resource control (RRC) network element), and the third network element is a non-service-oriented interface function network element or a radio network management function network element. Alternatively, the first network element is a non-service-oriented interface function network element, and the third network element is a radio network management function network element. Therefore, there are a plurality of manners for combining the first network element and the third network element, and deployment can be flexibly performed. This ensures that signaling transmission can be properly performed between the radio access network and the core network in various networking statuses.

With reference to any one of the first aspect or the first to the fourth possible implementations of the first aspect, in a fifth possible implementation of the first aspect, that the first network element selects the target interface function network element based on the capability information includes: If the capability information is used to indicate that the access and mobility management function network element has a capability of performing signaling transmission with the radio access network through the non-service-oriented interface function network element, the first network element selects the non-service-oriented interface function network element as the target interface function network element. Alternatively, if the capability information is used to indicate that the access and mobility management function network element has a capability of performing signaling transmission with the radio access network through the radio network management function network element, the first network element selects the radio network management function network element as the target interface function network element. Alternatively, if the capability information is used to indicate that the access and mobility management function network element has a capability of performing signaling transmission with the radio access network through at least one of the non-service-oriented interface function network element or the radio network management function network element, the first network element selects the non-service-oriented interface function network element or the radio network management function network element as the target interface function network element. In this case, the first network element can select the corresponding target interface function network element based on an indication of the capability information, thereby ensuring that signaling transmission can be properly performed between the radio access network and the core network.

With reference to any one of the first aspect or the first to the fifth possible implementations of the first aspect, in a sixth possible implementation of the first aspect, the method further includes: The first network element sends a user equipment registration request message (for example, a UE registration request) to the access and mobility management function network element through the target interface function network element. The first network element receives user equipment context information from the access and mobility management function network element through the target interface function network element. In this case, the first network element performs signaling transmission with the access and mobility management function network element through the target interface function network element. Because the target function network element is selected by the first network element based on the capability information of the access and mobility management function network element, proper signaling transmission between the radio access network and the core network can be ensured.

With reference to any one of the first aspect or the first to the fifth possible implementations of the first aspect, in a seventh possible implementation of the first aspect, the method further includes: The first network element sends a user equipment registration request message to the access and mobility management function network element. The first network element receives user equipment context information from the access and mobility management function network element. In this case, the first network element, which also serves as the target interface function network element, performs signaling transmission with the access and mobility management function network element. This can ensure proper signaling transmission between the radio access network and the core network.

With reference to any one of the first aspect or the first to the seventh possible implementations of the first aspect, in an eighth possible implementation of the first aspect, the first network element is the radio network management function network element, and the second network element is a network repository function network element (for example, a network repository function (NRF) network element). Alternatively, the first network element is the radio resource control network element, and the second network element is a domain name system server network element (for example, a DNS server network element) or the radio network management function network element. Alternatively, the first network element is the non-service-oriented interface function network element, and the second network element is a domain name system server network element. Therefore, there are a plurality of manners for combining the first network element and the second network element, and deployment can be flexibly performed. This ensures that signaling transmission can be properly performed between the radio access network and the core network in various networking statuses.

According to a second aspect, this application further provides a signaling transmission interface compatibility method, including: A fourth network element obtains identification information of an access and mobility management function network element and capability information of the access and mobility management function network element. The fourth network element stores the identification information and the capability information.

According to the method, the fourth network element prestores the capability information of the access and mobility management function network element. In this case, in a subsequent process in which signaling exchange is performed between a radio access network and a core network, a radio access network-side function network element can obtain the capability information of the access and mobility management function network element from the fourth network element, and select a corresponding target interface function network element based on the capability information, for signaling transmission, thereby ensuring that signaling transmission can be properly performed between the radio access network and the core network.

With reference to the second aspect, in a first possible implementation of the second aspect, the fourth network element is a network repository function network element, a radio network management function network element, or a non-service-oriented interface function network element. Therefore, there may be a plurality of optional manners of the fourth network element, so that deployment is flexibly performed during networking. This ensures that the fourth network element can store the identification information and the capability information in various networking statuses.

With reference to any one of the second aspect or the first possible implementation of the second aspect, in a second possible implementation of the second aspect, when the fourth network element is a radio network management function network element, that a fourth network element obtains identification information of an access and mobility management function network element and capability information of the access and mobility management function network element includes: The fourth network element receives the identification information and the capability information from the non-service-oriented interface function network element. In this case, in the subsequent process in which signaling exchange is performed between the radio access network and the core network, the radio access network-side function network element can query the radio network management function network element for the capability information, and select the corresponding interface function network element based on the capability information, for signaling transmission, thereby ensuring that signaling transmission can be properly performed between the radio access network and the core network.

With reference to any one of the second aspect or the first possible implementation of the second aspect, in a third possible implementation of the second aspect, when the fourth network element is a non-service-oriented interface function network element, that a fourth network element obtains identification information of an access and mobility management function network element and capability information of the access and mobility management function network element includes: The fourth network element receives the identification information and the capability information from an NGAP protocol layer of the core network. In this case, in the subsequent process of signaling exchange between the radio access network and the core network, the radio access network-side function network element can query the non-service-oriented interface function network element for the capability information, and select the corresponding interface function network element based on the capability information, for signaling transmission, thereby ensuring that signaling transmission can be properly performed between the radio access network and the core network.

With reference to any one of the second aspect or the first possible implementation of the second aspect, in a fourth possible implementation of the second aspect, when the fourth network element is a network repository function network element, that a fourth network element obtains identification information of an access and mobility management function network element and capability information of the access and mobility management function network element includes: The fourth network element receives the identification information and the capability information from the access and mobility management function network element. In this case, in the subsequent process in which signaling exchange is performed between the radio access network and the core network, the radio access network-side function network element can query the network repository function network element for the capability information, and select the corresponding interface function network element based on the capability information, for signaling transmission, thereby ensuring that signaling transmission can be properly performed between the radio access network and the core network.

With reference to any one of the second aspect or the first to the fourth possible implementations of the second aspect, in a fifth possible implementation of the second aspect, the capability information is used to indicate that the access and mobility management function network element has a capability of performing signaling transmission with the radio access network through the non-service-oriented interface function network element; or the capability information is used to indicate that the access and mobility management function network element has a capability of performing signaling transmission with the radio access network through the radio network management function network element; or the capability information is used to indicate that the access and mobility management function network element has a capability of performing signaling transmission with the radio access network through at least one of the non-service-oriented interface function network element or the radio network management function network element. In this case, during signaling transmission, a first network element can select the corresponding target interface function network element based on an indication of the capability information, thereby ensuring that signaling transmission can be properly performed between the radio access network and the core network.

According to a third aspect, this application further provides a signaling transmission interface compatibility apparatus. The signaling transmission interface compatibility apparatus has a function of implementing behavior of the first network element in the foregoing method. The function may be implemented by hardware, or may be implemented by hardware executing corresponding software. The hardware or software includes one or more modules corresponding to the foregoing function. In a possible design, a structure of the signaling transmission interface compatibility apparatus includes a processor and a transceiver. The processor is configured to enable the signaling transmission interface compatibility apparatus to perform a corresponding function in the foregoing method. The transceiver is configured to implement communication between the signaling transmission interface compatibility apparatus and a second/third network element. The signaling transmission interface compatibility apparatus may further include a memory. The memory is configured to be coupled to the processor, and stores a program instruction and data that are necessary for the signaling transmission interface compatibility apparatus.

According to the apparatus, the first network element obtains capability information of an access and mobility management function network element, and selects a corresponding target interface function network element based on the capability information. In this way, the first network element can perform signaling transmission with the access and mobility management function network element of a core network through the target interface function network element, thereby ensuring that signaling transmission can be properly performed between a radio access network and the core network.

According to a fourth aspect, this application further provides a signaling transmission interface compatibility apparatus. The signaling transmission interface compatibility apparatus has a function of implementing behavior of the fourth network element in the foregoing method. The function may be implemented by hardware, or may be implemented by hardware executing corresponding software. The hardware or software includes one or more modules corresponding to the foregoing function. In a possible design, a structure of the signaling transmission interface compatibility apparatus includes a processor and a transceiver. The processor is configured to enable the signaling transmission interface compatibility apparatus to perform a corresponding function in the foregoing method. The transceiver is configured to implement communication between the signaling transmission interface compatibility apparatus, a non-service-oriented interface function network element, an NGAP protocol layer of a core network, and an access and mobility management function network element of the core network. The signaling transmission interface compatibility apparatus may further include a memory. The memory is configured to be coupled to the processor, and stores a program instruction and data that are necessary for the signaling transmission interface compatibility apparatus.

According to the apparatus, the fourth network element prestores capability information of the access and mobility management function network element. In this case, in a subsequent process in which signaling exchange is performed between a radio access network and the core network, a radio access network-side function network element can obtain the capability information of the access and mobility management function network element from the fourth network element, and select a corresponding target interface function network element based on the capability information, for signaling transmission, thereby ensuring that signaling transmission can be properly performed between the radio access network and the core network.

According to a fifth aspect, this application provides a computer-readable storage medium. The computer-readable storage medium stores an instruction. When the instruction is run on a computer, the computer is enabled to perform the methods in the foregoing aspects.

According to a sixth aspect, this application provides a computer program product including an instruction. When the computer program product is run on a computer, the computer is enabled to perform the methods in the foregoing aspects.

According to a seventh aspect, this application provides a chip system. The chip system includes a processor, and is configured to support the apparatus or user equipment in implementing functions in the foregoing aspects, for example, generating or processing the information in the foregoing methods. In a possible design, the chip system further includes a memory. The memory is configured to store a program instruction and data that are necessary for a signaling transmission interface compatibility apparatus. The chip system may include a chip, or may include a chip and another discrete device.

DETAILED DESCRIPTION OF ILLUSTRATIVE EMBODIMENTS

The following clearly describes the technical solutions in the embodiments of this application with reference to the accompanying drawings in the embodiments of this application. In the descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, "a plurality of" means two or more in the descriptions of this application.

Before the technical solutions in the embodiments of this application are described, a technical scenario in the embodiments of this application is first described with reference to the accompanying drawings.

A control-plane function of a 5G core network defined in the 3GPP standard is divided into a plurality of network functions (NF), for example, an AMF network element and a network repository function (NRF) network element. In the 5G core network that is of a service-oriented architecture and that is defined in the 3GPP standard, a direct connection is established between network functions, and signaling exchange is performed between the network functions through a service-oriented interface. However, signaling transmission is performed between an access and mobility management function network element of the core network and a radio access network (RAN) through a non-service-oriented interface that is based on an NGAP protocol.

Figure 1:
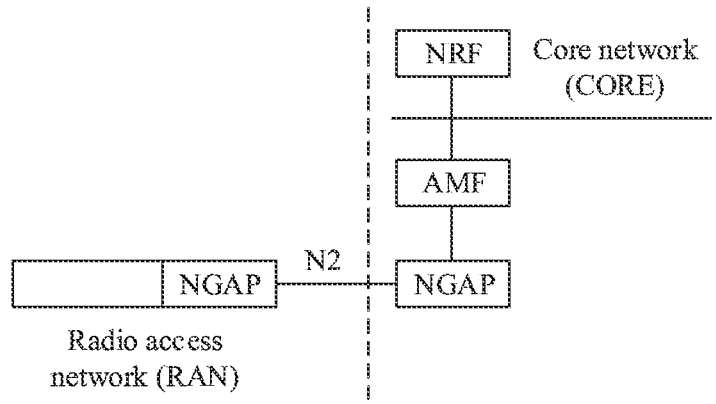
FIG. 1 is a schematic diagram of signaling transmission between a radio access network and a core network through a non-service-oriented interface.

FIG. 1 is a schematic diagram of signaling transmission between a radio access network and a core network through a non-service-oriented interface.

As shown in FIG. 1, the radio access network and the core network are connected through an N2 interface that is based on an NGAP protocol. For signaling transmitted from the radio access network to the core network, first, an NGAP protocol layer of the radio access network processes the signaling, and then sends processed signaling to an NGAP protocol layer of the core network through the N2 interface. Finally, the NGAP protocol layer of the core network forwards the signaling to an access and mobility management function network element.

The AMF network element in FIG. 1 may be responsible for a registration procedure performed by a terminal device, a mobility management procedure, a tracking area update procedure, and the like. The AMF network element may also be referred to as an AMF device or an AMF entity.

A network repository function (NRF) network element in FIG. 1 can provide a service discovery function. Optionally, the NRF network element can also maintain effective information about a network function network element of the core network. Optionally, the NRF network element can also maintain an effective service supported by the network function network element of the core network.

Figure 2:
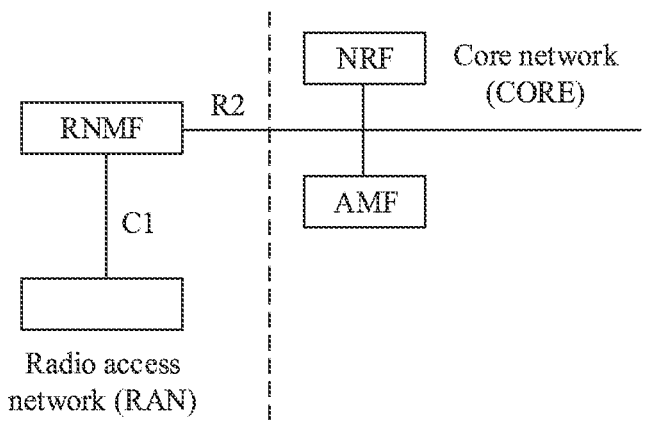
FIG. 2 is a schematic diagram of signaling transmission between a radio access network and a core network through a service-oriented interface.

FIG. 2 is a schematic diagram of signaling transmission between a radio access network and a core network through a service-oriented interface.

As shown in FIG. 2, to ensure that signaling transmission can also be performed between the radio access network and the core network through the service-oriented interface, a method is provided: A radio network management function (RNMF) network element is added to the radio access network, where the radio network management function network element is connected to a radio resource control network element through a C1 interface. The radio network management function network element performs service-oriented processing on an NGAP protocol of the radio access network, and provides an R2 service-oriented interface. In this way, signaling transmission can be performed between the radio access network and the core network through the R2 service-oriented interface.

Figure 3:
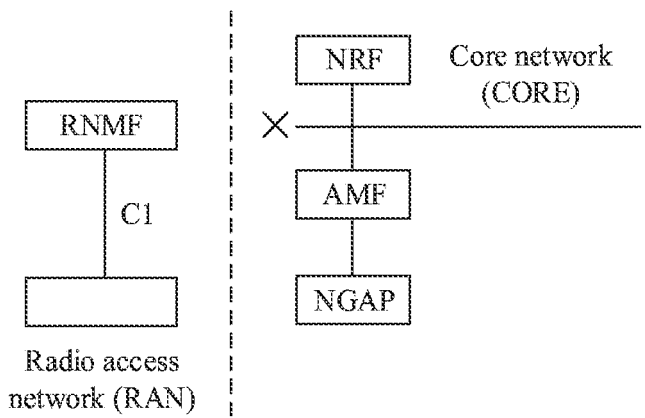
FIG. 3 is a schematic diagram of a scenario in which signaling transmission cannot be properly performed between a radio access network and a core network.

FIG. 3 is a schematic diagram of a scenario in which signaling transmission cannot be properly performed between a radio access network and a core network.

In a deployment scenario shown in FIG. 3, a service-oriented interface used for performing signaling transmission with the core network is provided by adding a radio network management function network element to the radio access network. In addition, the radio network management function network element performs service-oriented processing on an NGAP protocol of the radio access network, and a conventional function of an NGAP protocol layer of the radio access network is canceled; therefore, the radio access network cannot perform signaling transmission with the core network through a non-service-oriented interface. Moreover, the core network in FIG. 3 does not support signaling transmission with the radio access network through a service-oriented interface, but retains a conventional function of an NGAP protocol layer; therefore, the core network supports signaling transmission with the radio access network through a non-service-oriented interface. It can be learnt that in the deployment scenario shown in FIG. 3, the radio access network supports signaling transmission with the core network through a service-oriented interface, while the core network supports signaling transmission with the radio access network through a non-service-oriented interface. As a result, interface processing mechanisms used by the radio access network and the core network for signaling transmission are different, and signaling transmission cannot be properly performed.

An embodiment of this application provides a signaling transmission interface compatibility method, to resolve a problem that signaling transmission cannot be properly performed between a radio access network and a core network because of different interface processing mechanisms used by the radio access network and the core network for signaling transmission.

Figure 4:
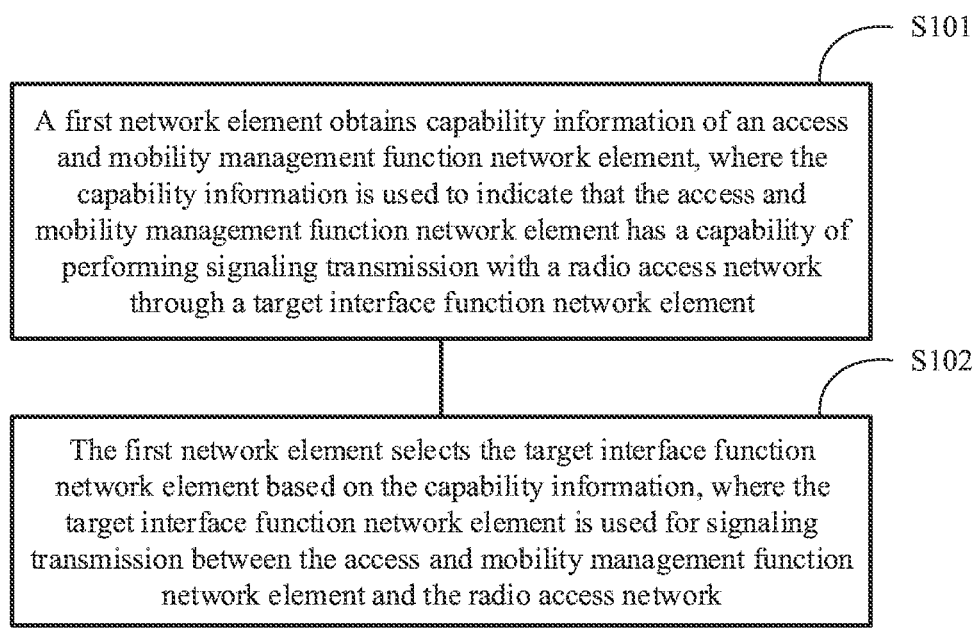
FIG. 4 is a flowchart of a signaling transmission interface compatibility method according to this application.

FIG. 4 is a flowchart of a signaling transmission interface compatibility method according to this application. As shown in FIG. 4, the method includes the following steps.

Step S101: A first network element obtains capability information of an access and mobility management function network element, where the capability information is used to indicate that the access and mobility management function network element has a capability of performing signaling transmission with a radio access network through a target interface function network element.

The first network element may obtain the capability information of the access and mobility management function network element in any one of the following three manners.

In a first possible manner, the first network element may obtain the capability information of the access and mobility management function network element from a second network element.

That the first network element may obtain the capability information of the access and mobility management function network element in the first possible manner may further be described with reference to FIG. 6.

In a second possible manner, the first network element may obtain the capability information of the access and mobility management function network element from a third network element.

That the first network element may obtain the capability information of the access and mobility management function network element in the second possible manner may further be described with reference to FIG. 7.

In a third possible manner, the first network element may obtain the capability information of the access and mobility management function network element from the first network element.

That the first network element may obtain the capability information of the access and mobility management function network element in the third possible manner may further be described with reference to FIG. 8.

In addition, the target interface function network element may be a non-service-oriented interface function network element, may be a radio network management function network element, or may be either a non-service-oriented interface function network element or a radio network management function network element.

The non-service-oriented interface function network element is an independent interface function network element (N2 interface function network element) that is formed after a function of an NGAP protocol layer of the radio access network is made independent of the radio access network in this application. The non-service-oriented interface function network element is connected to the radio network management function network element through a C2 interface, is connected to an NGAP protocol layer on a core network side through an N2 interface, and performs signaling transmission through the C2 interface and the N2 interface.

Step S102: The first network element selects the target interface function network element based on the capability information, where the target interface function network element is used for signaling transmission between the access and mobility management function network element and the radio access network.

That the first network element selects the target interface function network element based on the capability information includes the following three cases:

In a first possible case, if the capability information is used to indicate that the access and mobility management function network element has a capability of performing signaling transmission with the radio access network through the non-service-oriented interface function network element, the first network element selects the non-service-oriented interface function network element as the target interface function network element.

In a second possible case, if the capability information is used to indicate that the access and mobility management function network element has a capability of performing signaling transmission with the radio access network through the radio network management function network element, the first network element selects the radio network management function network element as the target interface function network element.

In a third possible case, if the capability information is used to indicate that the access and mobility management function network element has a capability of performing signaling transmission with the radio access network through at least one of the non-service-oriented interface function network element or the radio network management function network element, the first network element selects the non-service-oriented interface function network element or the radio network management function network element as the target interface function network element.

In a specific application scenario, the three cases in which the first network element selects the target interface function network element based on the capability information are respectively applicable to three networking scenarios in which the radio access network and the core network are included.

Figure 5:
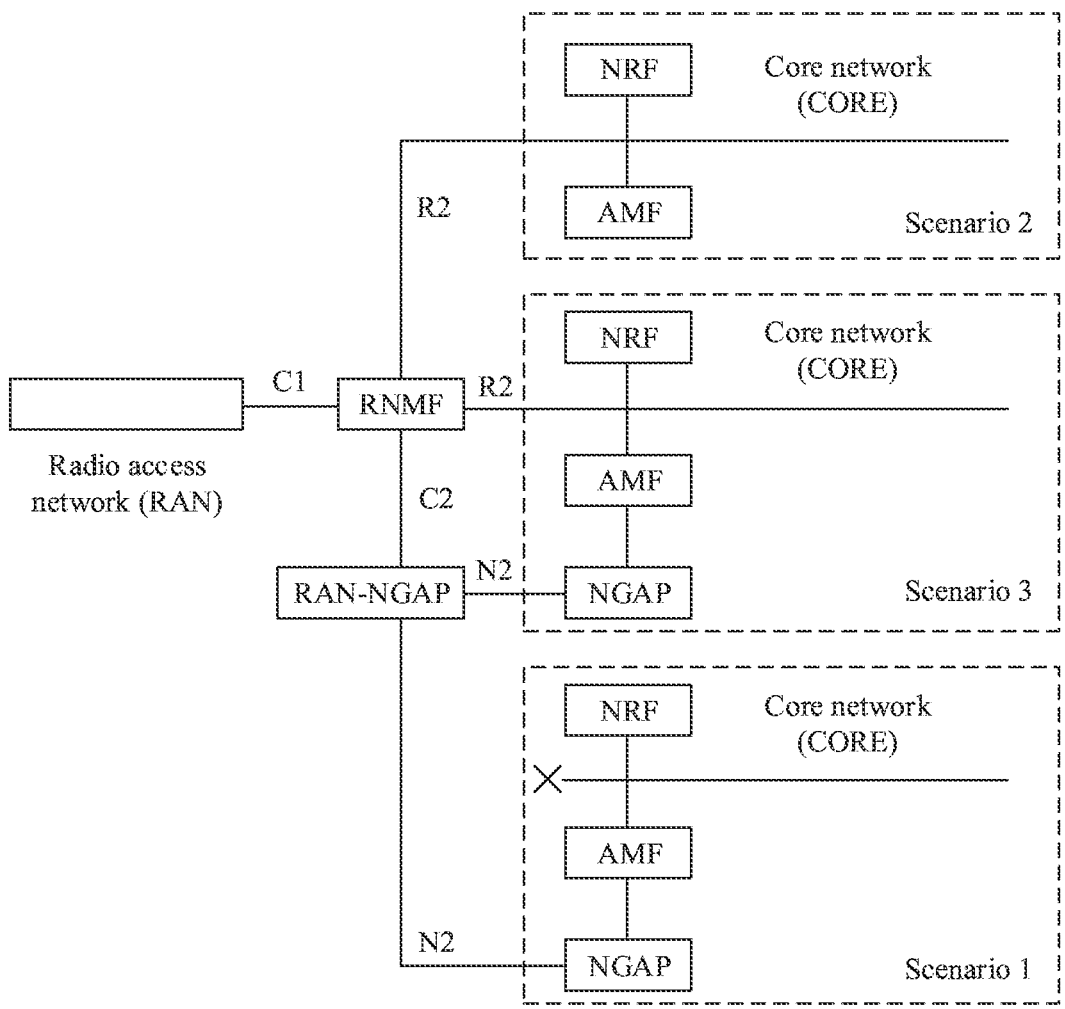
FIG. 5 is a schematic diagram of a compatible network architecture according to this application.

FIG. 5 is a schematic diagram of networking scenarios in which a radio access network and a core network are included according to this application. An RNMF is the radio network management function network element, a RAN-NGAP is the non-service-oriented interface function network element, and an NGAP is the NGAP protocol layer of the core network.

In a first networking scenario (a scenario 1), the access and mobility management function network element has a capability of performing signaling transmission with the radio access network through the non-service-oriented interface function network element. In this scenario, the first network element selects the non-service-oriented interface function network element as the target interface function network element.

In a second networking scenario (a scenario 2), the access and mobility management function network element has a capability of performing signaling transmission with the radio access network through the radio network management function network element. In this scenario, the first network element selects the radio network management function network element as the target interface function network element.

In a third networking scenario (a scenario 3), the access and mobility management function network element has a capability of performing signaling transmission with the radio access network through the at least one of the non-service-oriented interface function network element or the radio network management function network element. In this scenario, the first network element selects the non-service-oriented interface function network element or the radio network management function network element as the target interface function network element.

It can be learnt that in the present invention, different target interface function network elements can be selected based on different networking scenarios including the radio access network and the core network. This can ensure that signaling transmission can be properly performed between the radio access network and the core network in any networking scenario.

Therefore, according to the method provided in this embodiment of the present invention, the first network element obtains the capability information of the access and mobility management function network element, and selects the corresponding target interface function network element based on the capability information. In this way, the first network element can perform signaling transmission with the access and mobility management function network element of the core network through the target interface function network element, thereby ensuring that signaling transmission can be properly performed between the radio access network and the core network.

Figure 6:
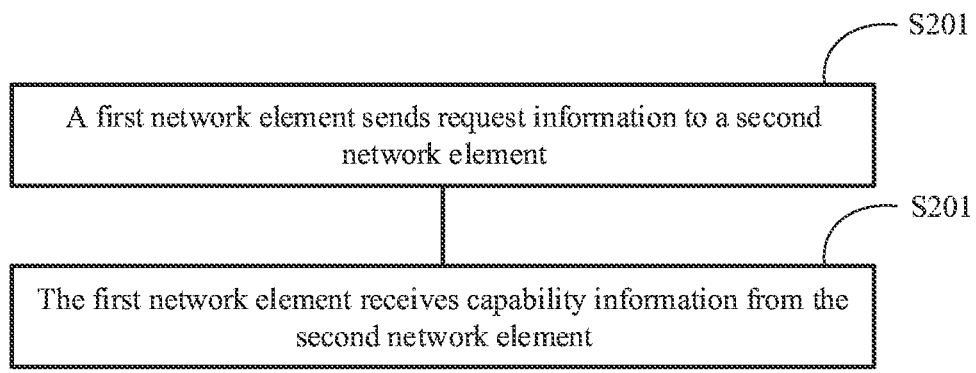
FIG. 6 is a flowchart of step S101 in a signaling transmission interface compatibility method according to this application.

In an embodiment, FIG. 6 is a flowchart of step S101 in a signaling transmission interface compatibility method according to this application. As shown in FIG. 6, that a first network element obtains capability information of an access and mobility management function network element may include the following steps.

Step S201: The first network element sends request information to a second network element.

For example, the request information is used to query a usable access and mobility management function network element of a core network, to obtain capability information of the usable access and mobility management function network element.

That the first network element obtains the capability information from the second network element may include four possible implementations:

In a first possible manner, the first network element is a radio network management function network element, and the second network element is a network repository function network element.

In a second possible manner, the first network element is a radio resource control network element, and the second network element is a domain name system server network element.

In a third possible manner, the first network element is a radio resource control network element, and the second network element is a radio network management function network element.

In a fourth possible manner, the first network element is a non-service-oriented interface function network element, and the second network element is a domain name system server network element.

Step S202: The first network element receives the capability information from the second network element.

When receiving the request information sent by the first network element, the second network element queries the usable access and mobility management function network element of the core network, and sends identification information and the capability information of the access and mobility management function network element to the first network element.

The first manner in which the first network element may obtain the capability information from the second network element may further be described with reference to FIG. 9.

The second manner in which the first network element may obtain the capability information from the second network element may further be described with reference to FIG. 10.

The third manner in which the first network element may obtain the capability information from the second network element may further be described with reference to FIG. 11.

The fourth manner in which the first network element may obtain the capability information from the second network element may further be described with reference to FIG. 12.

Therefore, according to the method in this embodiment of the present invention, the first network element obtains the capability information of the access and mobility management function network element from the second network element. In this way, the first network element can select a target interface function network element based on the capability information, and perform signaling transmission with the access and mobility management function network element of the core network through the target interface function network element, thereby ensuring that signaling transmission can be properly performed between a radio access network and the core network.

Figure 7:
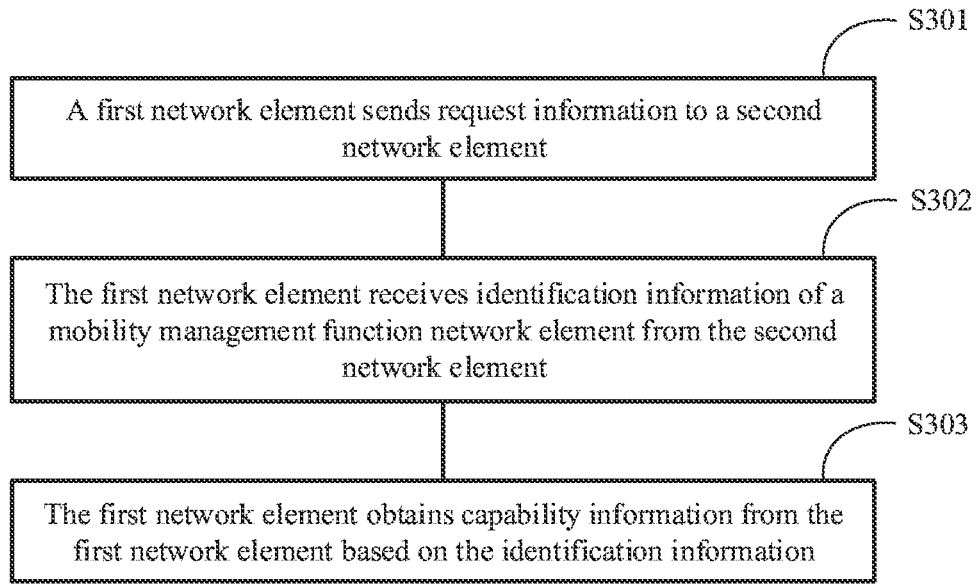
FIG. 7 is a flowchart of step S101 in another signaling transmission interface compatibility method according to this application.

In another embodiment, FIG. 7 is a flowchart of step S101 in another signaling transmission interface compatibility method according to this application. As shown in FIG. 7, that a first network element obtains capability information of an access and mobility management function network element may include the following steps.

Step S301: The first network element sends request information to a second network element.

For example, the request information is used to query a usable access and mobility management function network element of a core network, to obtain identification information of the usable access and mobility management function network element. The identification information is used to identify a unique identity of the access and mobility management function network element, and may specifically be an internet protocol (IP) address, a fully qualified domain name (FQDN), or the like of the access and mobility management function network element. This is not limited in the present invention.

That the first network element obtains capability information from the first network element may include two possible implementations:

In a first possible manner, the first network element is a radio network management function network element, and the second network element is a network repository function network element.

In a second possible manner, the first network element is a non-service-oriented interface function network element, and the second network element is a domain name system server network element.

Step S302: The first network element receives the identification information of the mobility management function network element from the second network element.

When receiving the request information sent by the first network element, the second network element queries the usable access and mobility management function network element, and sends the identification information of the access and mobility management function network element to the first network element.

Step S303: The first network element obtains the capability information from the first network element based on the identification information.

The first network element may specifically be any one of the radio network management function network element or the non-service-oriented interface function network element that stores an AMF context, where the AMF context includes the identification information and the capability information of the access and mobility management function network element. The first network element may query the AMF context based on the identification information received from the second network element, to find, from the AMF context, the capability information corresponding to the identification information.

Further, the AMF context may be a list that includes identification information and capability information of a plurality of access and mobility management function network elements, for example, as listed in Table 1. In Table 1, an AMF ID represents identification information of an access and mobility management function network element, and an AMF N2 capability represents capability information of an access and mobility management function network element. "CN-NGAP Only" is used to indicate that an access and mobility management function network element has a capability of performing signaling transmission with a radio access network through the non-service-oriented interface function network element. "CN-NGAP not supported" is used to indicate that an access and mobility management function network element has a capability of performing signaling transmission with the radio access network through the radio network management function network element. "CN-NGAP Preferred" is used to indicate that an access and mobility management function network element has a capability of performing signaling transmission with the radio access network through at least one of the non-service-oriented interface function network element or the radio network management function network element.

TABLE 2

| AMF ID | AMF N2 capability |
|---|---|
| 10.76.100.xxx | CN-NGAP Only |
| 10.61.100.xxx | CN-NGAP not supported |
| 10.91.100.xxx | CN-NGAP Preferred |

The first implementation in which the first network element may obtain the capability information from the first network element may further be described with reference to FIG. 13.

The second implementation in which the first network element may obtain the capability information from the first network element may further be described with reference to FIG. 14.

Therefore, according to the method in this embodiment of the present invention, the first network element obtains the capability information of the access and mobility management function network element from the first network element. In this way, the first network element can select a corresponding target interface function network element based on the capability information, and perform signaling transmission with the access and mobility management function network element through the target interface function network element, thereby ensuring that signaling transmission can be properly performed between the first network element and the mobility management function network element.

Figure 8:
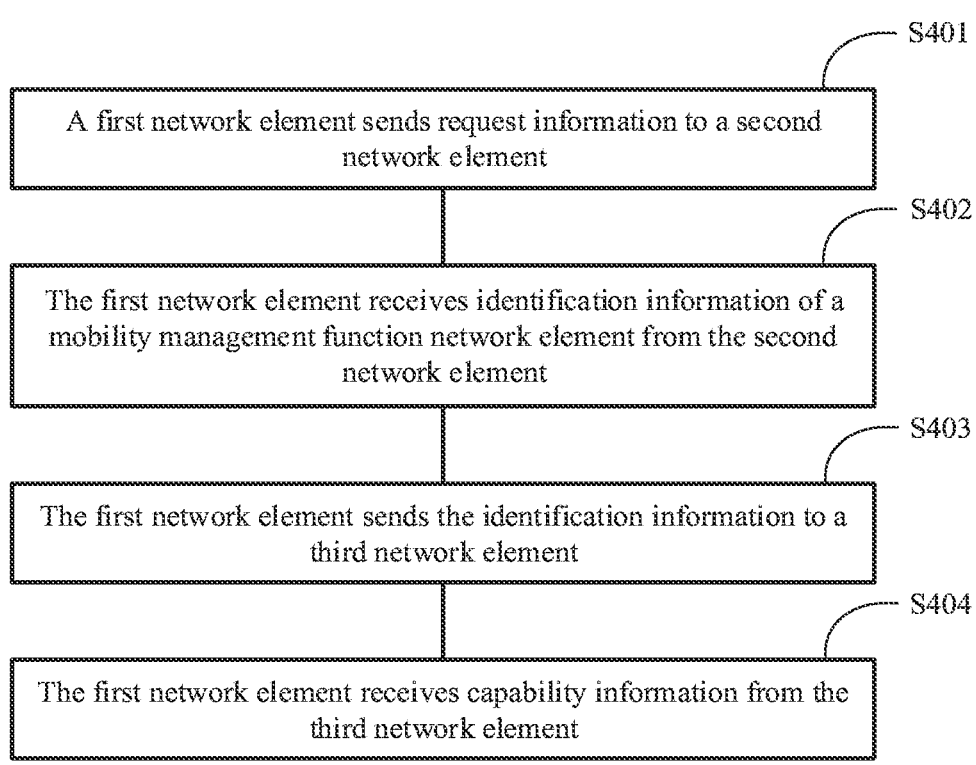
FIG. 8 is a flowchart of step S101 in still another signaling transmission interface compatibility method according to this application.

In still another embodiment, FIG. 8 is a flowchart of step S101 in still another signaling transmission interface compatibility method according to this application. As shown in FIG. 8, that a first network element obtains capability information of an access and mobility management function network element may include the following steps.

Step S401: The first network element sends request information to a second network element.

For example, the request information is used to query a usable access and mobility management function network element of a core network, to obtain identification information of the usable access and mobility management function network element. The identification information is used to identify a unique identity of the access and mobility management function network element, and may specifically be an internet protocol (IP) address, a fully qualified domain name (FQDN), or the like of the access and mobility management function network element. This is not limited in the present invention.

There are three possible manners for combining the first network element and the second network element.

In a first possible manner, the first network element is a radio network management function network element, and the second network element is a network repository function network element.

In a second possible manner, the first network element is a radio resource control network element, and the second network element is a domain name system server network element.

In a third possible manner, the first network element is a non-service-oriented interface function network element, and the second network element is a domain name system server network element.

Step S402: The first network element receives the identification information of the mobility management function network element from the second network element.

When receiving the request information sent by the first network element, the second network element queries the usable access and mobility management function network element, and sends the identification information of the access and mobility management function network element to the first network element.

Step S403: The first network element sends the identification information to a third network element.

There are four possible manners for combining the first network element and the third network element.

In a first possible manner, the first network element is the radio network management function network element, and the third network element is the non-service-oriented interface function network element.

In a second possible manner, the first network element is the radio resource control network element, and the third network element is the non-service-oriented interface function network element.

In a third possible manner, the first network element is the radio resource control network element, and the third network element is the radio network management function network element.

In a fourth possible manner, the first network element is the non-service-oriented interface function network element, and the third network element is the radio network management function network element.

Further, the third network element may specifically be any one of the radio network management function network element or the non-service-oriented interface function network element that stores an AMF context. For a specific description about the AMF context, refer to Table 1 and the description content of step S303. Details are not described herein again.

Step S404: The first network element receives capability information from the third network element.

With reference to the three possible manners for combining the first network element and the second network element and the four possible manners for combining the first network element and the third network element, there may be four possible implementations of obtaining the capability information by the first network element from the third network element.

In a first possible manner, the first network element is the radio network management function network element, the second network element is the network repository function network element, and the third network element is the non-service-oriented interface function network element.

That the first network element may obtain the capability information from the third network element in the first possible manner may further be described with reference to FIG. 15.

In a second possible manner, the first network element is the radio resource control network element, the second network element is the domain name system server network element, and the third network element is the non-service-oriented interface function network element.

That the first network element may obtain the capability information from the third network element in the second possible manner may further be described with reference to FIG. 16.

In a third possible manner, the first network element is the radio resource control network element, the second network element is the domain name system server network element, and the third network element is the radio network management function network element.

That the first network element may obtain the capability information from the third network element in the third possible manner may further be described with reference to FIG. 17.

In a fourth possible manner, the first network element is the non-service-oriented interface function network element, the second network element is the domain name system server network element, and the third network element is the radio network management function network element.

That the first network element may obtain the capability information from the third network element in the fourth possible manner may further be described with reference to FIG. 18.

Therefore, according to the method in this embodiment of the present invention, the first network element obtains the capability information of the access and mobility management function network element from the third network element. In this way, the first network element can select a target interface function network element based on the capability information, and perform signaling transmission with the access and mobility management function network element through the target interface function network element, thereby ensuring that signaling transmission can be properly performed between a radio access network and the core network.

With reference to the accompanying drawings, the following further describes the four possible implementations in which the first network element may obtain the capability information from the second network element.

In an embodiment, the first implementation of obtaining the capability information by the first network element from the second network element is provided. FIG. 9 is a flowchart of a first implementation of obtaining capability information by a first network element from a second network element. The first network element is a radio network management function network element, and the second network element is a network repository function network element. The first implementation specifically includes the following steps.

Step S501: The radio network management function network element sends request information to the network repository function network element.

For example, the request information is an AMF service discovery request message (NF service discovery request), and is used by the network repository function network element to query a usable access and mobility management function network element of a core network.

For example, the AMF service discovery request message is generated based on a user equipment (UE) registration request message. First, user equipment sends the user equipment registration request message to a radio resource control network element. Then, the radio resource control network element forwards the user equipment registration request message to the radio network management function network element. Finally, the radio network management function network element sends the AMF service discovery request message to the network repository function network element when receiving the user equipment registration request message.

Step S502: The radio network management function network element receives identification information and capability information from the network repository function network element.

For example, the network repository function network element queries the usable access and mobility management function network element of the core network based on the AMF service discovery request message, and sends the found identification information and capability information that are corresponding to the access and mobility management function network element to the radio network management function network element.

For example, the network repository function network element configures the identification information and the capability information in an AMF service discovery response message (NF service discovery response), and sends the identification information and the capability information to the radio network management function network element by using the AMF service discovery response message.

Therefore, according to the method in this embodiment of the present invention, the radio network management function network element obtains the capability information of the access and mobility management function network element from the network repository function network element. In this way, the radio network management function network element can select a target interface function network element based on the capability information, and perform signaling transmission with the access and mobility management function network element through the target interface function network element, thereby ensuring that signaling transmission can be properly performed between a radio access network and the core network.

In another embodiment, the second implementation of obtaining the capability information by the first network element from the second network element is provided. FIG. 10 is a flowchart of a second implementation of obtaining capability information by a first network element from a second network element. The first network element is a radio resource control network element, and the second network element is a domain name system server network element. The second implementation specifically includes the following steps.

Step S601: The radio resource control network element sends request information to the domain name system server network element.

For example, the request information is a DNS query request message, and is used by the domain name system server network element to query user equipment and a usable access and mobility management function network element.

For example, the DNS query request message is generated based on a user equipment registration request message. This may specifically include: First, the user equipment sends the user equipment registration request message to the radio resource control network element. Then, the radio resource control network element sends the DNS query request message to the domain name system server network element when receiving the user equipment registration request message from the user equipment.

Step S602: The radio resource control network element receives identification information and capability information from the domain name system server network element.

For example, the domain name system server network element queries the usable access and mobility management function network element of a core network based on the DNS query request message, and sends the found identification information and capability information that are corresponding to the access and mobility management function network element to the radio resource control network element.

For example, the domain name system server network element adds the identification information and the capability information to a DNS query response message, and sends the identification information and the capability information to a radio network management function network element by using the DNS query response message.

Therefore, according to the method in this embodiment of the present invention, the radio resource control network element obtains the capability information of the access and mobility management function network element from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and the core network.

In still another embodiment, the third implementation of obtaining the capability information by the first network element from the second network element is provided. FIG. 11 is a flowchart of a third implementation of obtaining capability information by a first network element from a second network element. The first network element is a radio resource control network element, and the second network element is a radio network management function network element. The third implementation specifically includes the following steps.

Step S701: The radio resource control network element sends request information to the radio network management function network element.

For example, the request information is a UE message direction request, where the UE message direction request carries a message type. For example, the message type may include an uplink non-access stratum (NAS) message and the like. The UE message direction request is generated based on a user equipment registration request message sent by user equipment to the radio resource control network element.

For example, the radio network management function network element determines, based on the message type carried in the UE message direction request, whether to obtain identification information and capability information. When the message type is an uplink non-access stratum message, the radio network management function network element obtains identification information and capability information.

Step S702: The radio resource control network element receives the identification information and the capability information from the radio network management function network element.

For implementation of a specific procedure of obtaining the identification information and the capability information by the radio network management function network element in this embodiment, refer to steps in other embodiments of the present invention, for example, step S501 and step S502, step S901 to step S903, and step S1101 to step S1104. Details are not described herein again.

Therefore, according to the method in this embodiment of the present invention, the radio resource control network element obtains the capability information of the access and mobility management function network element from the radio network management function network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

In yet another embodiment, the fourth implementation of obtaining the capability information by the first network element from the second network element is provided. FIG. 12 is a flowchart of a fourth implementation of obtaining capability information by a first network element from a second network element. The first network element is a non-service-oriented interface function network element, and the second network element is a domain name system server network element. The fourth implementation specifically includes the following steps.

Step S801: The non-service-oriented interface function network element sends request information to the domain name system server network element.

For example, the request information is a DNS query request message.

For example, the DNS query request message is generated based on a user equipment registration request message. This may specifically include: First, user equipment sends the user equipment registration request message to a radio resource control network element. Then, the radio resource control network element forwards the user equipment registration request message to the non-service-oriented interface function network element. Finally, the non-service-oriented interface function network element sends the DNS query request message to the domain name system server network element when receiving the user equipment registration request message.

Step S802: The non-service-oriented interface function network element receives identification information and capability information from the domain name system server network element.

For example, the domain name system server network element queries a usable access and mobility management function network element based on the DNS query request message, and sends the found identification information and capability information that are corresponding to the access and mobility management function network element to the non-service-oriented interface function network element.

For example, the domain name system server network element configures the identification information and the capability information in a DNS query response message and sends the identification information and the capability information to the non-service-oriented interface function network element by using the DNS query response message.

Therefore, according to the method in this embodiment of the present invention, the non-service-oriented interface function network element obtains the capability information of the access and mobility management function network element from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

With reference to the accompanying drawings, the following further describes the two possible implementations in which the first network element may obtain the capability information from the first network element.

In an embodiment, the first implementation of obtaining the capability information by the first network element from the first network element is provided. FIG. 13 is a flowchart of a first implementation of obtaining capability information by a first network element from the first network element. The first network element is a radio network management function network element, and the second network element is a network repository function network element. The first implementation specifically includes the following steps.

Step S901: The radio network management function network element sends request information to the network repository function network element.

For example, the request information is an AMF service discovery request message (NF service discovery request).

Step S902: The radio network management function network element receives identification information from the network repository function network element.

For example, the network repository function network element queries a usable access and mobility management function network element of a radio access network based on the AMF service discovery request message, and sends the found identification information corresponding to the access and mobility management function network element to the radio network management function network element.

For example, the network repository function network element may configure the identification information in an AMF service discovery response message (NF service response), and send the identification information and capability information to the radio network management function network element by using the AMF service discovery response message.

Step S903: The radio network management function network element obtains the capability information from the radio network management function network element based on the identification information.

For example, because the radio network management function network element stores an AMF context, the radio network management function network element may query, based on the identification information received from the network repository function network element, the AMF context stored in the radio network management function network element for the capability information corresponding to the identification information.

Therefore, according to the method in this embodiment of the present invention, the radio network management function network element obtains, based on the identification information received from the network repository function network element, the capability information of the access and mobility management function network element from the AMF context stored in the radio network management function network element. In this way, the radio network management function network element can select a target interface function network element based on the capability information, and perform signaling transmission with the access and mobility management function network element through the target interface function network element, thereby ensuring that signaling transmission can be properly performed between the radio access network and a core network.

In another embodiment, the second implementation of obtaining the capability information by the first network element from the first network element is provided. FIG. 14 is a flowchart of a second implementation of obtaining capability information by a first network element from the first network element. The first network element is a non-service-oriented interface function network element, and the second network element is a domain name system server network element. The second implementation specifically includes the following steps.

Step S1001: The non-service-oriented interface function network element sends request information to the domain name system server network element.

For example, the request information is a DNS query request message (DNS query request).

Step S1002: The non-service-oriented interface function network element receives identification information from the domain name system server network element.

For example, the domain name system server network element configures the identification information in a DNS query response message (DNS query response), and sends the identification information to the non-service-oriented interface function network element by using the DNS query response message.

For example, the domain name system server network element queries a usable access and mobility management function network element of a core network based on the DNS query request message, and sends the found identification information corresponding to the access and mobility management function network element to the non-service-oriented interface function network element.

Step S1003: The non-service-oriented interface function network element obtains capability information from the non-service-oriented interface function network element based on the identification information.

For example, because the non-service-oriented interface function network element stores an AMF context, the non-service-oriented interface function network element may query, based on the identification information received from a network repository function network element, the AMF context stored in the non-service-oriented interface function network element for the capability information corresponding to the identification information.

Therefore, according to the method in this embodiment of the present invention, the non-service-oriented interface function network element obtains, based on the identification information received from the network repository function network element, the capability information of the access and mobility management function network element from the AMF context stored in the non-service-oriented interface function network element. In this way, the non-service-oriented interface function network element can select a target interface function network element based on the capability information, and perform signaling transmission with the access and mobility management function network element through the target interface function network element, thereby ensuring that signaling transmission can be properly performed between a radio access network and the core network.

With reference to the accompanying drawings, the following further describes the four possible implementations in which the first network element may obtain the capability information from the third network element.

In an embodiment, the first implementation of obtaining the capability information by the first network element from the third network element is provided. FIG. 15 is a flowchart of a first implementation of obtaining capability information by a first network element from a third network element. The first network element is a radio network management function network element, the second network element is a network repository function network element, and the third network element is a non-service-oriented interface function network element. The first implementation specifically includes the following steps.

Step S1101: The radio network management function network element sends request information to the network repository function network element.

For example, the request information is an AMF service discovery request message (NF service discovery request).

Step S1102: The radio network management function network element receives identification information from the network repository function network element.

For example, the network repository function network element queries a usable access and mobility management function network element of a core network based on the AMF service discovery request message, and sends the found identification information corresponding to the access and mobility management function network element to the radio network management function network element.

For example, the network repository function network element may configure the identification information in an AMF service discovery response message (NF service response), and send the identification information and capability information to the radio network management function network element by using the AMF service discovery response message.

Step S1103: The radio network management function network element sends the identification information to the non-service-oriented interface function network element.

For example, because the non-service-oriented interface function network element stores an AMF context, after the non-service-oriented interface function network element receives the identification information sent by the radio network management function network element, the non-service-oriented interface function network element first queries the AMF context for the corresponding capability information based on the identification information, and then sends the found capability information to the radio network management function network element.

Step S1104: The radio network management function network element receives the capability information from the non-service-oriented interface function network element.

Therefore, according to the method in this embodiment of the present invention, the radio network management function network element obtains the capability information of the access and mobility management function network element from the non-service-oriented interface function network element based on the identification information received from the network repository function network element. In this way, the radio network management function network element can select a target interface function network element based on the capability information, and perform signaling transmission with the access and mobility management function network element through the target interface function network element, thereby ensuring that signaling transmission can be properly performed between a radio access network and the core network.

In another embodiment, the second implementation of obtaining the capability information by the first network element from the third network element is provided. FIG. 16 is a flowchart of a second implementation of obtaining capability information by a first network element from a third network element. The first network element is a radio resource control network element, the second network element is a domain name system server network element, and the third network element is a non-service-oriented interface function network element. The second implementation specifically includes the following steps.

Step S1201: The radio resource control network element sends request information to the domain name system server network element.

For example, the request information is an AMF service discovery request message (NF service discovery request).

Step S1202: The radio resource control network element receives identification information from the domain name system server network element.

For example, the domain name system server network element queries a usable access and mobility management function network element of a core network based on the AMF service discovery request message, and sends the found identification information corresponding to the access and mobility management function network element to the radio resource control network element.

For example, the domain name system server network element may configure the identification information in an AMF service discovery response message (NF service response), and send the identification information and capability information to the radio resource control network element by using the AMF service discovery response message.

Step S1203: The radio resource control network element sends the identification information to the non-service-oriented interface function network element.

For example, because the non-service-oriented interface function network element stores an AMF context, after the non-service-oriented interface function network element receives the identification information sent by the radio resource control network element, the non-service-oriented interface function network element first queries the AMF context for the corresponding capability information based on the identification information, and then sends the found capability information to the radio resource control network element.

Step S1204: The radio resource control network element receives the capability information from the non-service-oriented interface function network element.

Therefore, according to the method in this embodiment of the present invention, the radio resource control network element obtains the capability information of the access and mobility management function network element from the non-service-oriented interface function network element based on the identification information received from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and the core network.

In still another embodiment, the third implementation of obtaining the capability information by the first network element from the third network element is provided. FIG. 17 is a flowchart of a third implementation of obtaining capability information by a first network element from a third network element. The first network element is a radio resource control network element, the second network element is a domain name system server network element, and the third network element is a radio network management function network element. The third implementation specifically includes the following steps.

Step S1301: The radio resource control network element sends request information to the domain name system server network element.

For example, the request information is an AMF service discovery request message (NF service discovery request).

Step S1302: The radio resource control network element receives identification information from the domain name system server network element.

For example, the domain name system server network element queries a usable access and mobility management function network element of a core network based on the AMF service discovery request message, and sends the found identification information corresponding to the access and mobility management function network element to the radio resource control network element.

Further, the domain name system server network element may configure the identification information in an AMF service discovery response message (NF service response), and send the identification information and capability information to the radio network management function network element by using the AMF service discovery response message.

Step S1303: The radio resource control network element sends the identification information to the radio network management function network element.

For example, because the radio network management function network element stores an AMF context, after the radio network management function network element receives the identification information sent by the radio resource control network element, the radio network management function network element first queries the AMF context for the corresponding capability information based on the identification information, and then sends the found capability information to the radio resource control network element.

Step S1304: The radio resource control network element receives the capability information from the radio network management function network element.

Therefore, according to the method in this embodiment of the present invention, the radio resource control network element obtains the capability information of the access and mobility management function network element from the radio network management function network element based on the identification information received from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and the core network.

In yet another embodiment, the fourth implementation of obtaining the capability information by the first network element from the third network element is provided. FIG. 18 is a flowchart of a fourth implementation of obtaining capability information by a first network element from a third network element. The first network element is a non-service-oriented interface function network element, the second network element is a domain name system server network element, and the third network element is a radio network management function network element. The fourth implementation specifically includes the following steps.

Step S1401: The non-service-oriented interface function network element sends request information to the domain name system server network element.

For example, the request information is a DNS query request message.

Step S1402: The non-service-oriented interface function network element receives identification information from the domain name system server network element.

For example, the domain name system server network element configures the identification information in a DNS query response message, and sends the identification information to the non-service-oriented interface function network element by using the DNS query response message.

For example, the domain name system server network element queries a usable access and mobility management function network element of a core network based on the DNS query request message, and sends the found identification information corresponding to the access and mobility management function network element to the non-service-oriented interface function network element.

Step S1403: The non-service-oriented interface function network element sends the identification information to the radio network management function network element.

For example, because the radio network management function network element stores an AMF context, after the radio network management function network element receives the identification information sent by the radio resource control network element, the radio network management function network element first queries the AMF context for the corresponding capability information based on the identification information, and then sends the found capability information to the non-service-oriented interface function network element.

Step S1404: The non-service-oriented interface function network element receives the capability information from the radio network management function network element.

Therefore, according to the method in this embodiment of the present invention, the non-service-oriented interface function network element obtains the capability information of the access and mobility management function network element from the radio network management function network element based on the identification information received from the domain name system server network element. In this way, the non-service-oriented interface function network element can select a target interface function network element based on the capability information, and perform signaling transmission with the access and mobility management function network element through the target interface function network element, thereby ensuring that signaling transmission can be properly performed between a radio access network and the core network.

Figure 19:
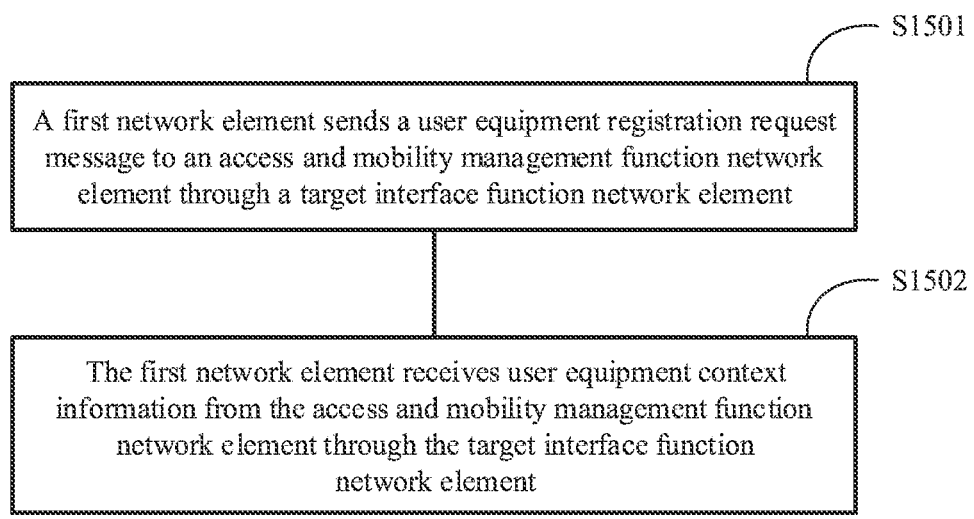
FIG. 19 is a flowchart of a method for performing signaling transmission by a first network element with an access and mobility management function network element.

In some embodiments, the present invention further provides a method for performing signaling transmission by a first network element with an access and mobility management function network element through a target interface function network element. FIG. 19 is a flowchart of a method for performing signaling transmission by a first network element with an access and mobility management function network element. The method includes the following steps.

Step S1501: The first network element sends a user equipment registration request message to the access and mobility management function network element through the target interface function network element.

When a connection is established between user equipment and the first network element, the user equipment sends the user equipment registration request message to the first network element, where the user equipment registration request message is used by the user equipment to complete registration in the access and mobility management function network element.

Step S1502: The first network element receives user equipment context information from the access and mobility management function network element through the target interface function network element.

That the first network element performs signaling transmission with the access and mobility management function network element through the target interface function network element may include four possible implementations.

In a first possible manner, the first network element is a radio network management function network element, and the target interface function network element is a non-service-oriented interface function network element.

Figure 20:
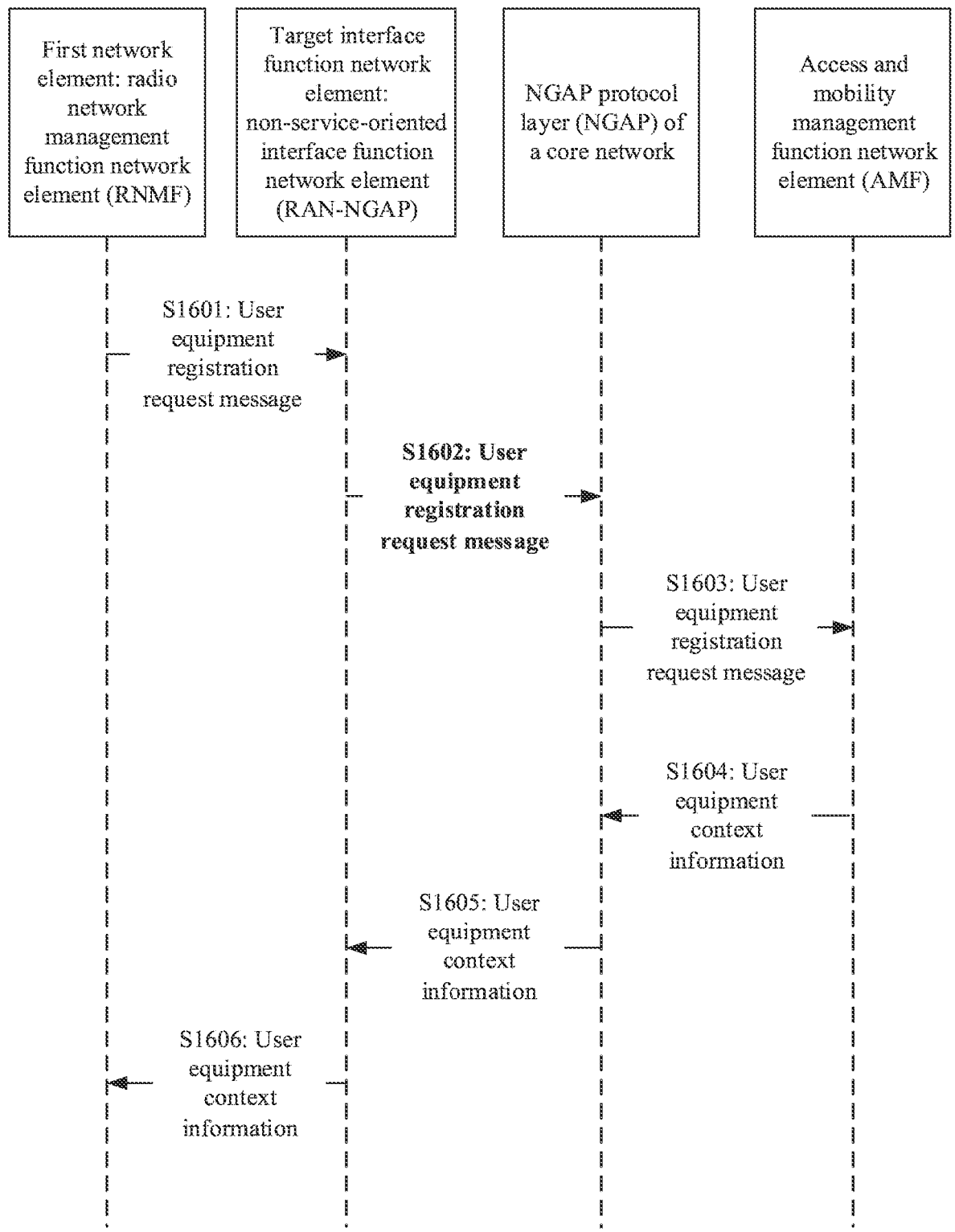
FIG. 20 is a flowchart of a first implementation of performing signaling transmission by a first network element with an access and mobility management function network element through a target interface function network element.

The first implementation of performing signaling transmission by the first network element with the access and mobility management function network element through the target interface function network element may further be described with reference to FIG. 20.

In a second possible manner, the first network element is a radio resource control network element, and the target interface function network element is a non-service-oriented interface function network element.

Figure 21:
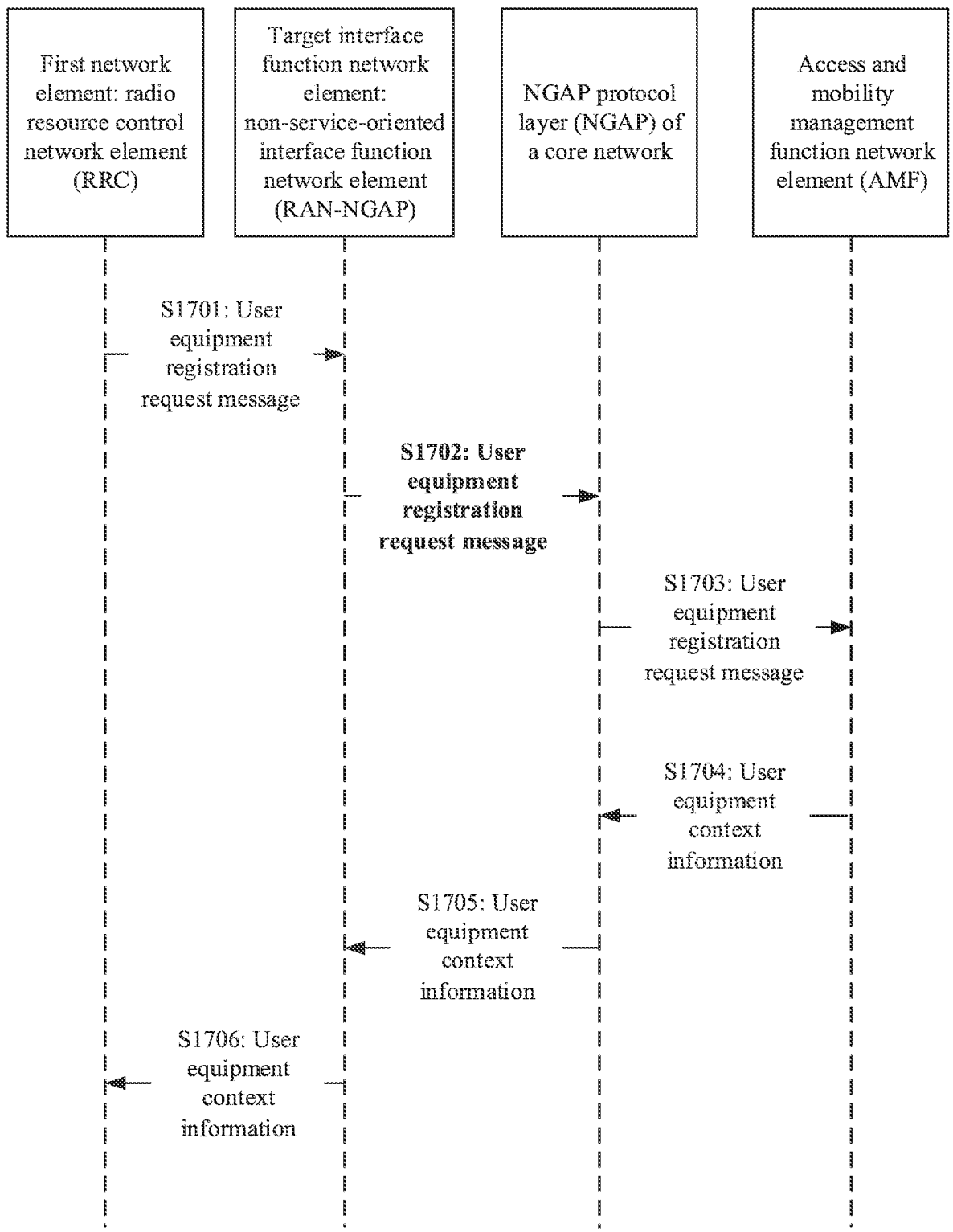
FIG. 21 is a flowchart of a second implementation of performing signaling transmission by a first network element with an access and mobility management function network element through a target interface function network element.

The second implementation of performing signaling transmission by the first network element with the access and mobility management function network element through the target interface function network element may further be described with reference to FIG. 21.

In a third possible manner, the first network element is a radio resource control network element, and the target interface function network element is a radio network management function network element.

Figure 22:
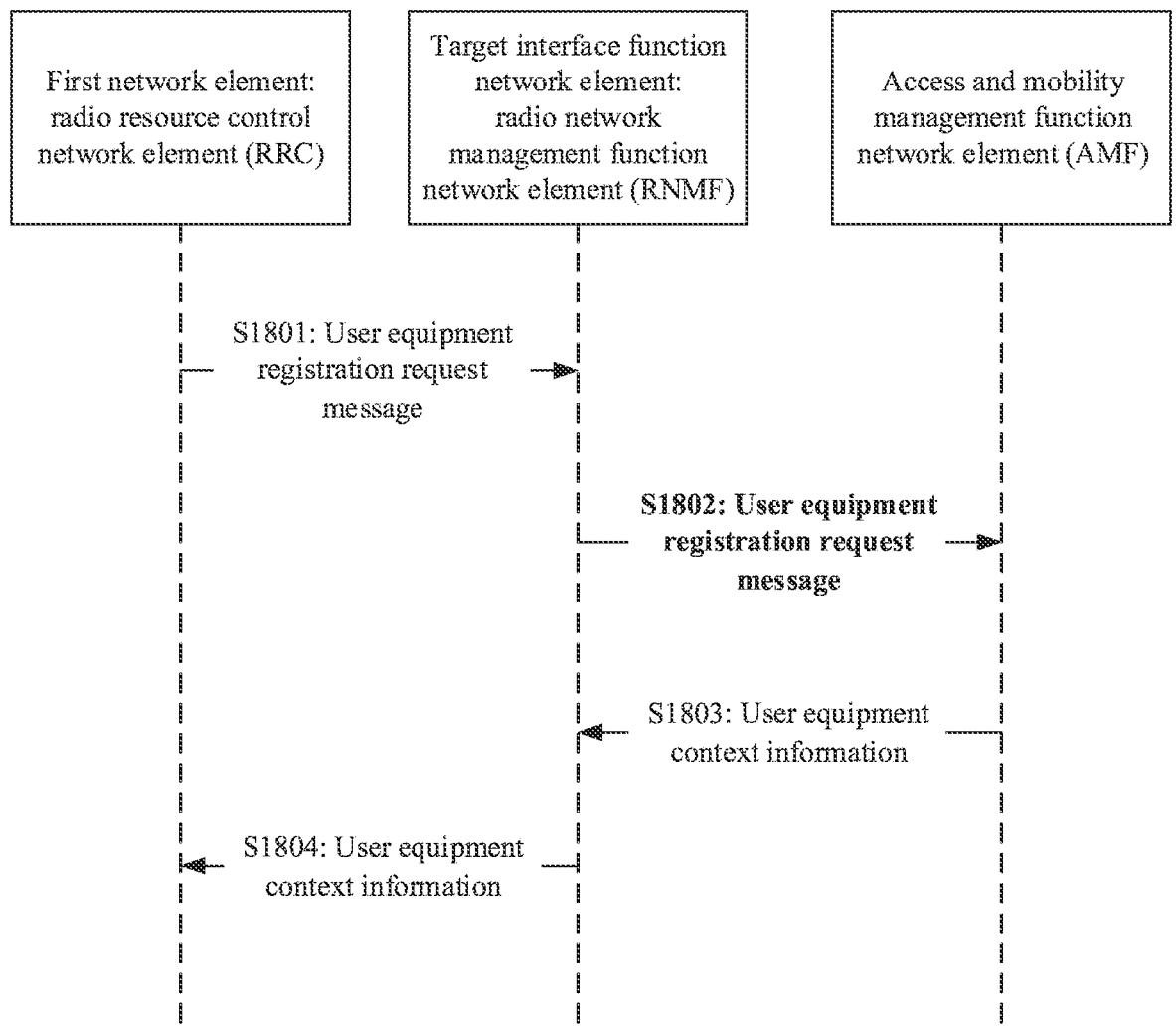
FIG. 22 is a flowchart of a third implementation of performing signaling transmission by a first network element with an access and mobility management function network element through a target interface function network element.

The third implementation of performing signaling transmission by the first network element with the access and mobility management function network element through the target interface function network element may further be described with reference to FIG. 22.

In a fourth possible manner, the first network element is a non-service-oriented interface function network element, and the target interface function network element is a radio network management function network element.

Figure 23:
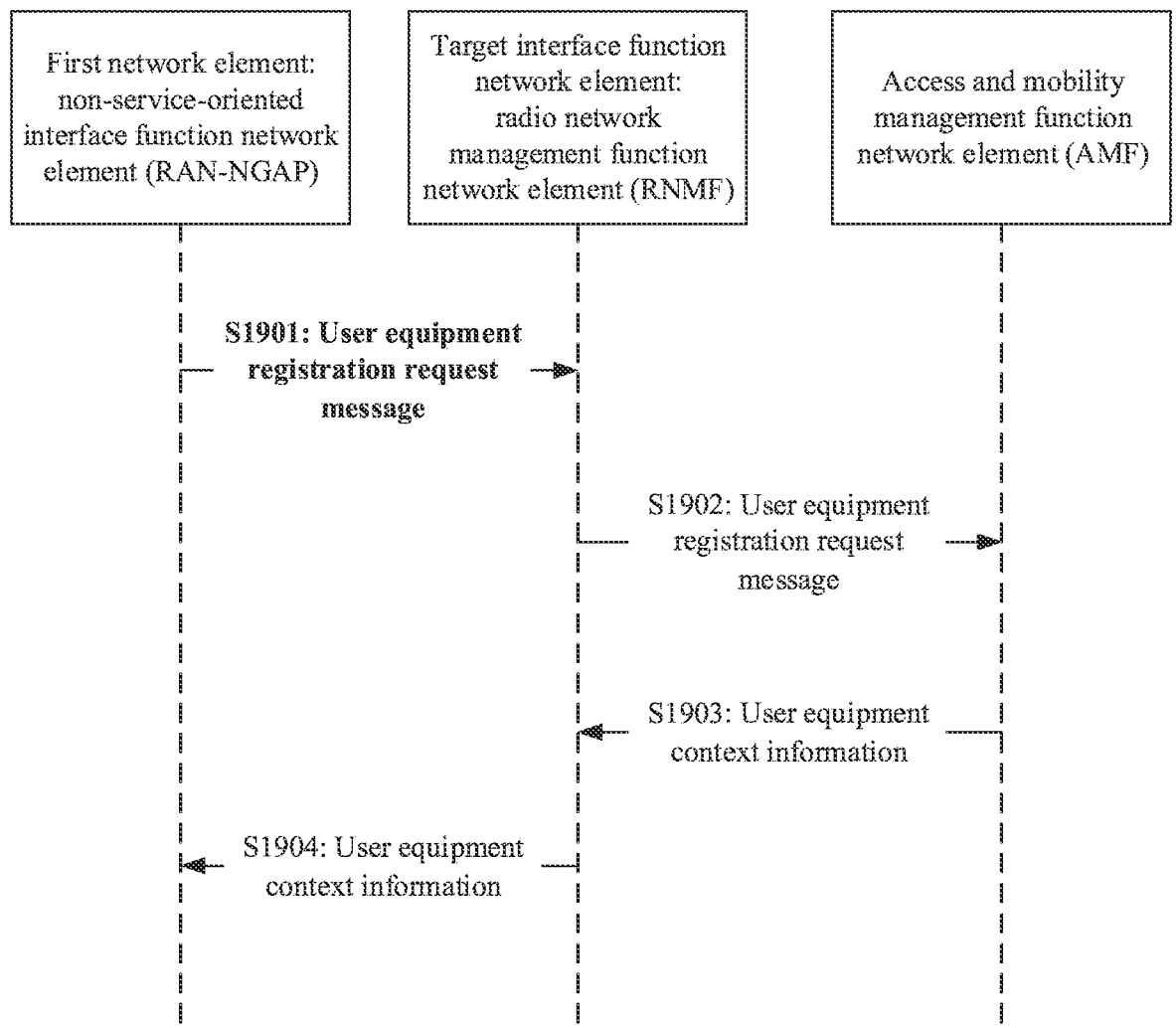
FIG. 23 is a flowchart of a fourth implementation of performing signaling transmission by a first network element with an access and mobility management function network element through a target interface function network element.

The fourth implementation of performing signaling transmission by the first network element with the access and mobility management function network element through the target interface function network element may further be described with reference to FIG. 23.

Therefore, according to the method provided in this embodiment of the present invention, the first network element performs signaling transmission with the access and mobility management function network element through the target interface function network element. Because the target function network element is selected by the first network element based on capability information of the access and mobility management function network element, proper signaling transmission between a radio access network and a core network can be ensured.

With reference to the accompanying drawings, the following further describes the four possible implementations of performing signaling transmission by the first network element with the access and mobility management function network element through the target interface function network element.

In an embodiment, the first implementation of performing signaling transmission by the first network element with the access and mobility management function network element through the target interface function network element is provided. FIG. 20 is a flowchart of a first implementation of performing signaling transmission by a first network element with an access and mobility management function network element through a target interface function network element. The first network element is a radio network management function network element, and the target interface function network element is a non-service-oriented interface function network element. The first implementation specifically includes the following steps.

Step S1601: The radio network management function network element sends a user equipment registration request message to the non-service-oriented interface function network element.

Step S1602: The non-service-oriented interface function network element forwards the user equipment registration request message to an NGAP protocol layer of a core network.

Step S1603: The NGAP protocol layer of the core network forwards the user equipment registration request message to the access and mobility management function network element.

Step S1604: The access and mobility management function network element requests user equipment context information based on the user equipment registration request message, and sends the user equipment context information to the NGAP protocol layer of the core network.

Step S1605: The NGAP protocol layer of the core network forwards the user equipment context information to the non-service-oriented interface function network element.

Step S1606: The non-service-oriented interface function network element forwards the user equipment context information to the radio network management function network element.

Therefore, according to the method provided in this embodiment of the present invention, the radio network management function network element performs signaling transmission with the access and mobility management function network element through the non-service-oriented interface function network element. Because the target function network element is selected by the radio network management function network element based on capability information of the access and mobility management function network element, proper signaling transmission between a radio access network and the core network can be ensured.

In another embodiment, the second implementation of performing signaling transmission by the first network element with the access and mobility management function network element through the target interface function network element is provided. FIG. 21 is a flowchart of a second implementation of performing signaling transmission by a first network element with an access and mobility management function network element through a target interface function network element. The first network element is a radio resource control network element, and the target interface function network element is a non-service-oriented interface function network element. The second implementation specifically includes the following steps.

Step S1701: The radio resource control network element sends a user equipment registration request message to the non-service-oriented interface function network element.

Step S1702: The non-service-oriented interface function network element forwards the user equipment registration request message to an NGAP protocol layer of a core network.

Step S1703: The NGAP protocol layer of the core network forwards the user equipment registration request message to the access and mobility management function network element.

Step S1704: The access and mobility management function network element requests user equipment context information based on the user equipment registration request message, and sends the user equipment context information to the NGAP protocol layer of the core network.

Step S1705: The NGAP protocol layer of the core network forwards the user equipment context information to the non-service-oriented interface function network element.

Step S1706: The non-service-oriented interface function network element forwards the user equipment context information to the radio resource control network element.

Therefore, according to the method provided in this embodiment of the present invention, the radio resource control network element performs signaling transmission with the access and mobility management function network element through the non-service-oriented interface function network element. Because the target function network element is selected by the radio resource control network element based on capability information of the access and mobility management function network element, proper signaling transmission between a radio access network and the core network can be ensured.

In still another embodiment, the third implementation of performing signaling transmission by the first network element with the access and mobility management function network element through the target interface function network element is provided. FIG. 22 is a flowchart of a third implementation of performing signaling transmission by a first network element with an access and mobility management function network element through a target interface function network element. The first network element is a radio resource control network element, and the target interface function network element is a radio network management function network element. The third implementation specifically includes the following steps.

Step S1801: The radio resource control network element sends a user equipment registration request message to the radio network management function network element.

Step S1802: The radio network management function network element forwards the user equipment registration request message to the access and mobility management function network element.

Step S1803: The access and mobility management function network element requests user equipment context information based on the user equipment registration request message, and sends the user equipment context information to the radio network management function network element.

Step S1804: The radio network management function network element forwards the user equipment context information to the radio resource control network element.

Therefore, according to the method provided in this embodiment of the present invention, the radio resource control network element performs signaling transmission with the access and mobility management function network element through the radio network management function network element. Because the target function network element is selected by the radio resource control network element based on capability information of the access and mobility management function network element, proper signaling transmission between a radio access network and a core network can be ensured.

In yet another embodiment, the fourth implementation of performing signaling transmission by the first network element with the access and mobility management function network element through the target interface function network element is provided. FIG. 23 is a flowchart of a fourth implementation of performing signaling transmission by a first network element with an access and mobility management function network element through a target interface function network element. The first network element is a non-service-oriented interface function network element, and the target interface function network element is a radio network management function network element. The fourth implementation specifically includes the following steps.

Step S1901: The non-service-oriented interface function network element sends a user equipment registration request message to the radio network management function network element.

Step S1902: The radio network management function network element forwards the user equipment registration request message to the access and mobility management function network element.

Step S1903: The access and mobility management function network element requests user equipment context information based on the user equipment registration request message, and sends the user equipment context information to the radio network management function network element.

Step S1904: The radio network management function network element forwards the user equipment context information to the non-service-oriented interface function network element.

Therefore, according to the method provided in this embodiment of the present invention, the non-service-oriented interface function network element performs signaling transmission with the access and mobility management function network element through the radio network management function network element. Because the target function network element is selected by a radio resource control network element based on capability information of the access and mobility management function network element, proper signaling transmission between a radio access network and a core network can be ensured.

Figure 24:
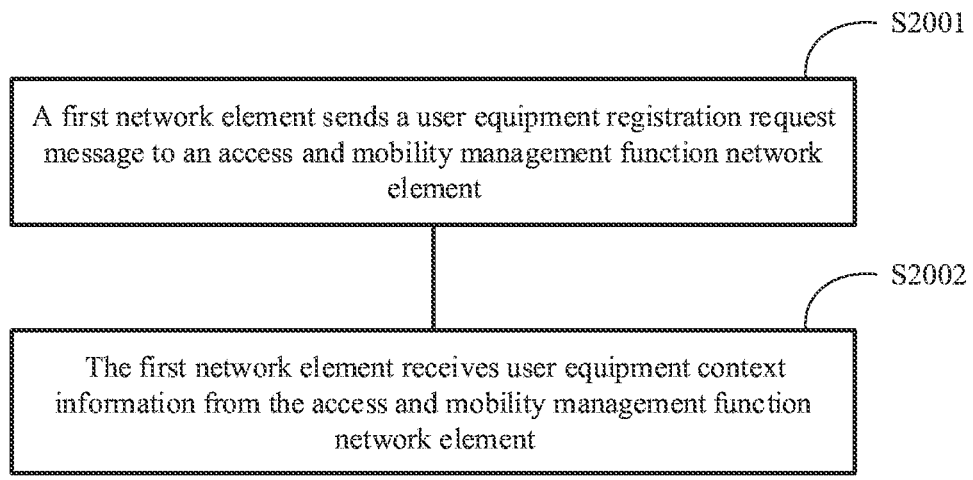
FIG. 24 is a flowchart of another method for performing signaling transmission by a first network element with an access and mobility management function network element.

In some embodiments, this application further provides a method for performing signaling transmission by a first network element, which also serves as a target interface function network element, with an access and mobility management function network element. FIG. 24 is a flowchart of another method for performing signaling transmission by a first network element with an access and mobility management function network element. The method includes the following steps.

Step S2001: The first network element sends a user equipment registration request message to the access and mobility management function network element.

Step S2002: The first network element receives user equipment context information from the access and mobility management function network element.

That the first network element, which also serves as the target interface function network element, performs signaling transmission with the access and mobility management function network element may include two possible implementations.

In a first possible manner, the first network element is a radio network management function network element.

Figure 25:
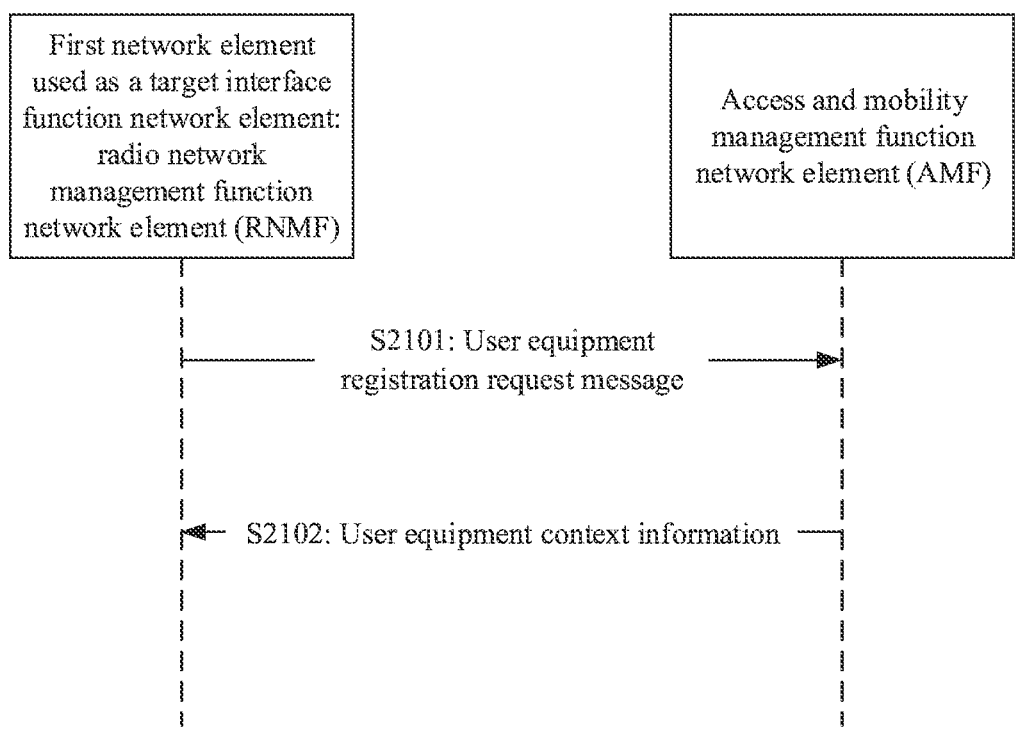
FIG. 25 is a flowchart of a first implementation of performing signaling transmission by a first network element with an access and mobility management function network element.

The first implementation of performing signaling transmission by the first network element, which also serves as the target interface function network element, with the access and mobility management function network element may further be described with reference to FIG. 25.

In a second possible manner, the first network element is a non-service-oriented interface function network element.

Figure 26:
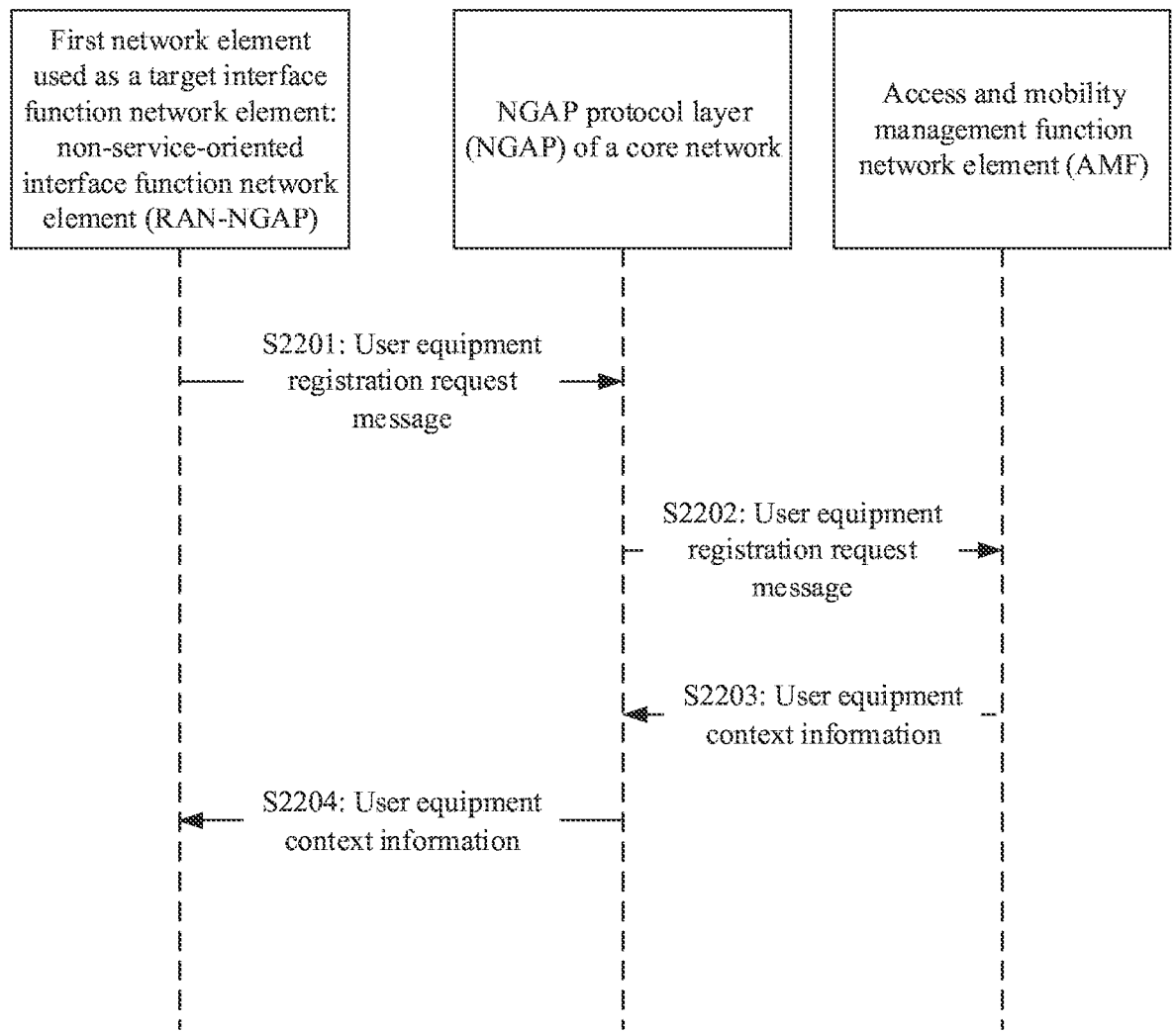
FIG. 26 is a flowchart of a second implementation of performing signaling transmission by a first network element with an access and mobility management function network element.

The second implementation of performing signaling transmission by the first network element, which also serves as the target interface function network element, with the access and mobility management function network element may further be described with reference to FIG. 26.

Therefore, according to the method provided in this embodiment of the present invention, the first network element, which also serves as the target interface function network element, performs signaling transmission with the access and mobility management function network element. This can ensure proper signaling transmission between a radio access network and a core network.

With reference to the accompanying drawings, the following further describes the two possible implementations of performing signaling transmission by the first network element with the access and mobility management function network element through the target interface function network element.

In an embodiment, the first implementation of performing signaling transmission by the first network element with the access and mobility management function network element is provided. FIG. 25 is a flowchart of a first implementation of performing signaling transmission by a first network element with an access and mobility management function network element. The first network element is a radio network management function network element. The first implementation specifically includes the following steps.

Step S2101: The radio network management function network element sends a user equipment registration request message to the access and mobility management function network element.

Step S2102: The radio network management function network element receives user equipment context information from the access and mobility management function network element.

Therefore, according to the method provided in this embodiment of the present invention, the radio network management function network element, which also serves as a target interface function network element, performs signaling transmission with the access and mobility management function network element. This can ensure proper signaling transmission between a radio access network and a core network.

In another embodiment, the second implementation of performing signaling transmission by the first network element with the access and mobility management function network element is provided. FIG. 26 is a flowchart of a second implementation of performing signaling transmission by a first network element with an access and mobility management function network element. The first network element is a non-service-oriented interface function network element. The second implementation specifically includes the following steps.

Step S2201: The non-service-oriented interface function network element sends a user equipment registration request message to an NGAP protocol layer of a core network.

Step S2202: The NGAP protocol layer of the core network forwards the user equipment registration request message to the access and mobility management function network element.

Step S2203: The access and mobility management function network element requests user equipment context information based on the user equipment registration request message, and sends the user equipment context information to the NGAP protocol layer of the core network.

Step S2204: The NGAP protocol layer of the core network forwards the user equipment context information to the non-service-oriented interface function network element.

Therefore, according to the method provided in this embodiment of the present invention, the non-service-oriented interface function network element, which also serves as a target interface function network element, performs signaling transmission with the access and mobility management function network element. This can ensure proper signaling transmission between a radio access network and the core network.

Figure 27:
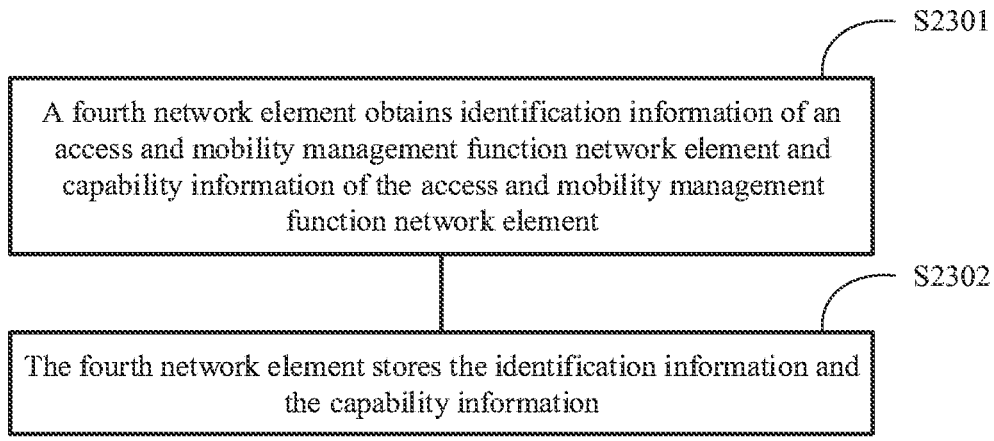
FIG. 27 is a flowchart of capability information reporting according to this application.

In some embodiments, this application further provides a capability information reporting procedure. FIG. 27 is a flowchart of capability information reporting according to this application. Specifically, the reporting procedure includes the following steps.

Step S2301: A fourth network element obtains identification information of an access and mobility management function network element and capability information of the access and mobility management function network element.

The fourth network element may be a network repository function network element, a radio network management function network element, or a non-service-oriented interface function network element.

The capability information includes the following three cases.

In a first possible case, the capability information is used to indicate that the access and mobility management function network element has a capability of performing signaling transmission with a radio access network through the non-service-oriented interface function network element.

In a second possible case, the capability information is used to indicate that the access and mobility management function network element has a capability of performing signaling transmission with a radio access network through the radio network management function network element.

In a third possible case, the capability information is used to indicate that the access and mobility management function network element has a capability of performing signaling transmission with a radio access network through at least one of the non-service-oriented interface function network element or the radio network management function network element.

Step S2302: The fourth network element stores the identification information and the capability information.

For example, the fourth network element creates an AMF context, where the AMF context includes the identification information and the capability information of the access and mobility management function network element.

In addition, after storing the identification information and the capability information, the fourth network element may further send response information to the access and mobility management function network element. The response message is used by the access and mobility management function network element to confirm that the fourth network element has received the identification information and the capability information.

Further, the capability information reporting procedure may include three possible implementations.

In a first possible manner, the fourth network element is a network repository function network element.

Figure 28:
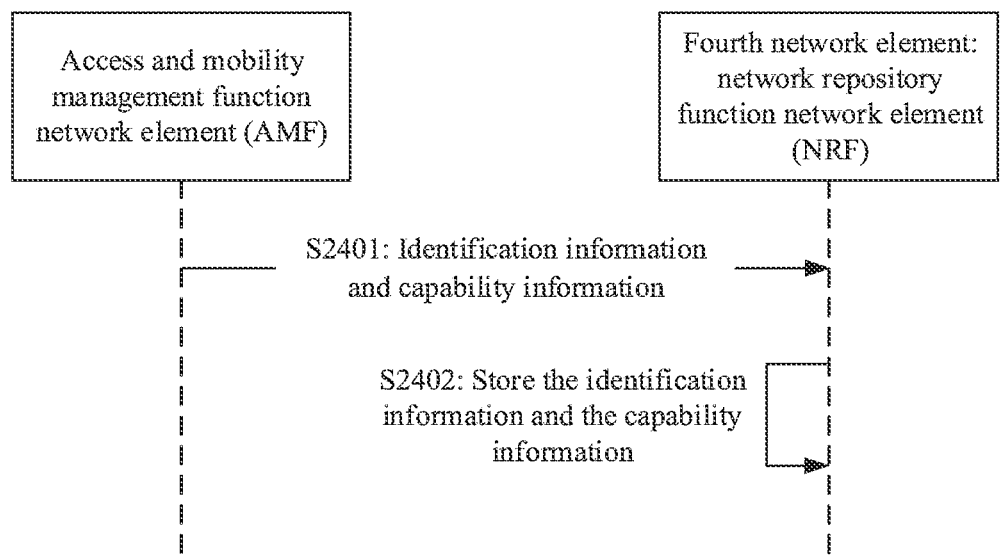
FIG. 28 is a flowchart of a first implementation of a capability information reporting procedure.

The first implementation of the capability information reporting procedure may further be described with reference to FIG. 28.

In a second possible manner, the fourth network element is a non-service-oriented interface function network element.

Figure 29:
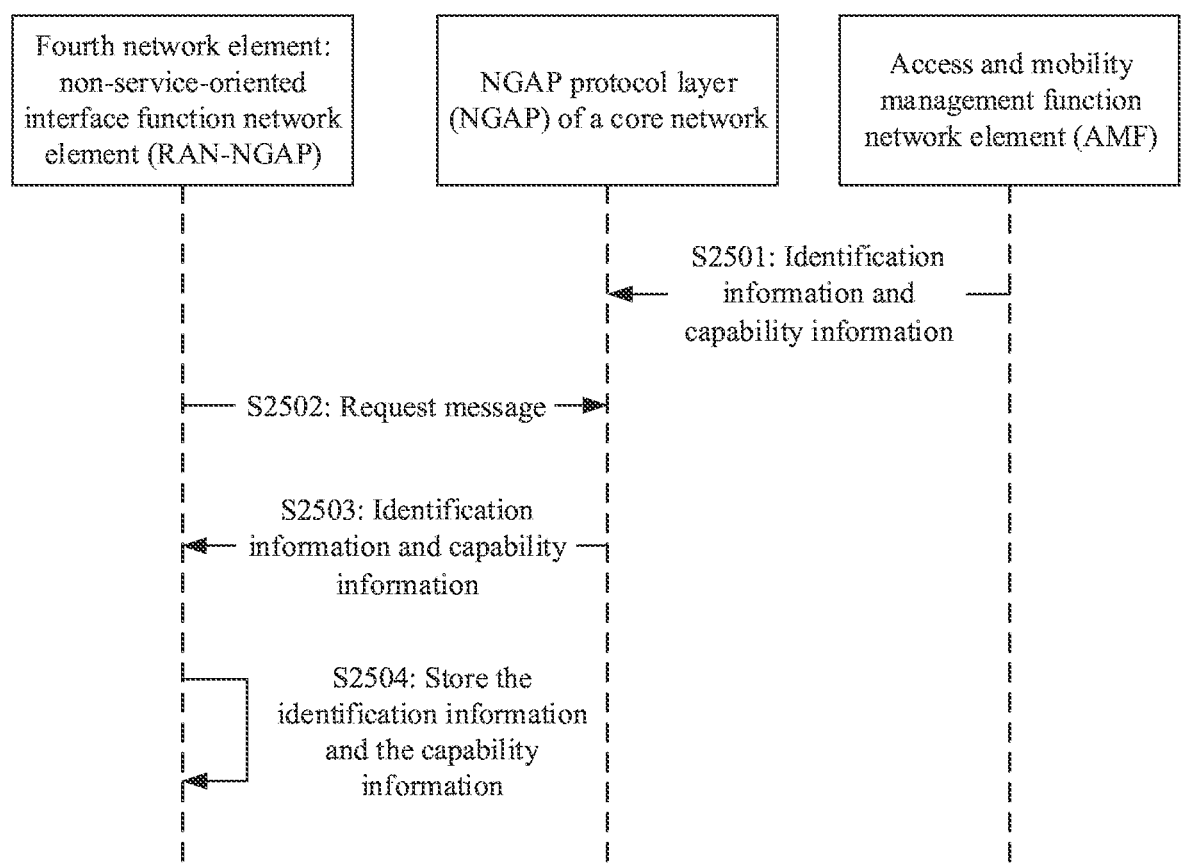
FIG. 29 is a flowchart of a second implementation of a capability information reporting procedure.

The second implementation of the capability information reporting procedure may further be described with reference to FIG. 29.

In a third possible manner, the fourth network element is a radio network management function network element.

Figure 30:
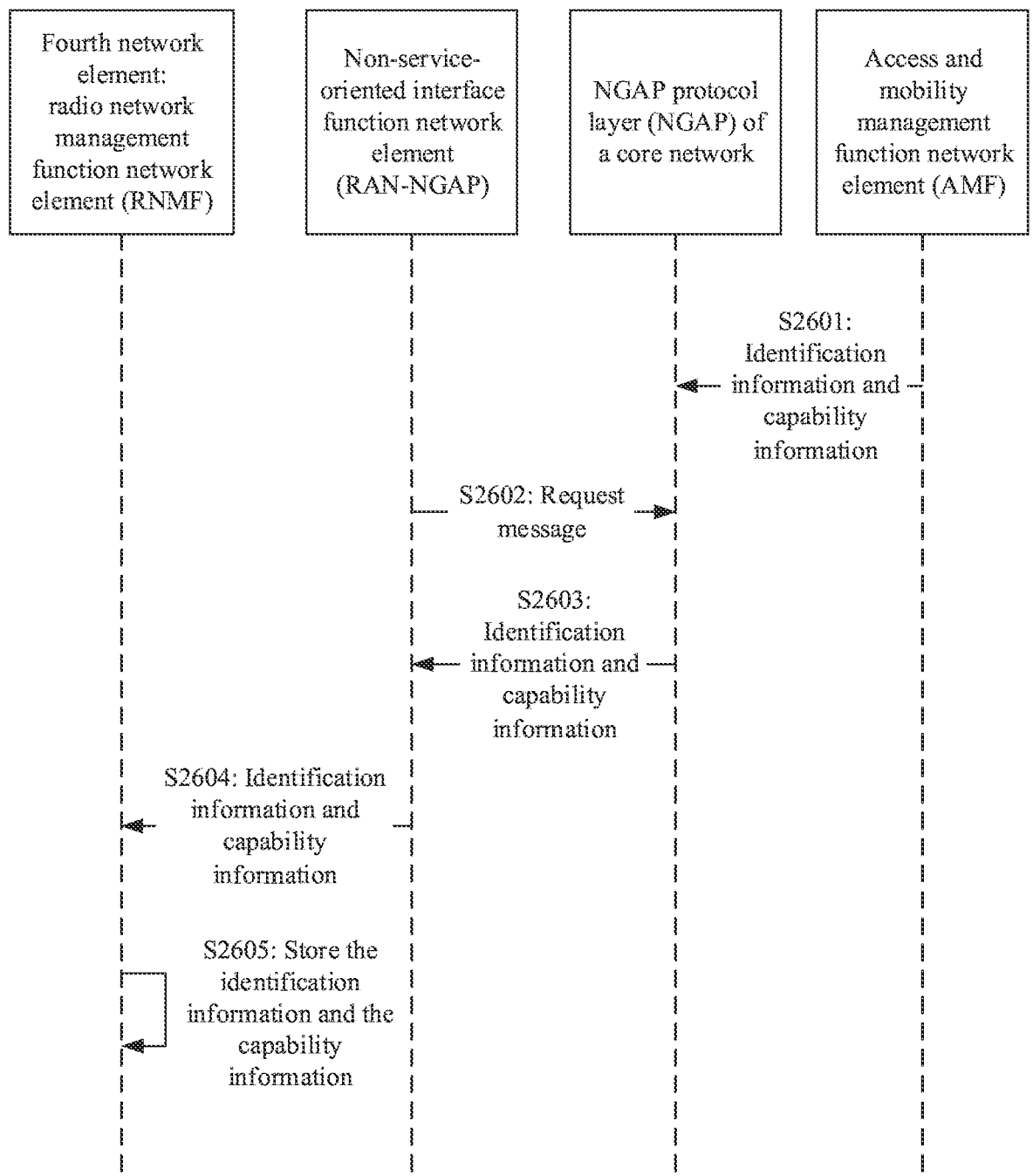
FIG. 30 is a flowchart of a third implementation of a capability information reporting procedure.

The third implementation of the capability information reporting procedure may further be described with reference to FIG. 30.

Therefore, according to the method provided in this embodiment of the present invention, the fourth network element prestores the capability information of the access and mobility management function network element. In this case, in a subsequent process in which signaling exchange is performed between the radio access network and a core network, a radio access network-side function network element can obtain the capability information of the access and mobility management function network element from the fourth network element, and select a corresponding target interface function network element based on the capability information, for signaling transmission, thereby ensuring that signaling transmission can be properly performed between the radio access network and the core network.

With reference to the accompanying drawings, the following further describes the three possible implementations of the capability information reporting procedure.

In an embodiment, the first implementation of the capability information reporting procedure is provided. FIG. 28 is a flowchart of a first implementation of a capability information reporting procedure. The fourth network element is a network repository function network element. The first implementation specifically includes the following steps.

Step S2401: The network repository function network element obtains identification information of an access and mobility management function network element and capability information of the access and mobility management function network element.

For example, when the access and mobility management function network element of a core network that is of a service-oriented architecture is started, the access and mobility management function network element needs to send an NF registration request message (NF register request) to the network repository function network element. In this application, the identification information and the capability information of the access and mobility management function network element are configured in the NF registration request message, and the identification information and the capability information are sent to the network repository function network element by using the network function registration request message; and the network repository function network element obtains the identification information and the capability information by receiving the NF registration request message.

That the access and mobility management function network element is started means that the access and mobility management function network element is powered on, initialized, or the like.

Step S2402: The network repository function network element stores the identification information and the capability information.

The network repository function network element stores the identification information and the capability information, and may further send an NF registration response message (NF register response) to the access and mobility management function network element. The NF registration response message is used to notify the access and mobility management function network element of a status in which the network repository function network element has stored the identification information and the capability information.

Therefore, according to the method provided in this embodiment of the present invention, the network repository function network element obtains the identification information and the capability information of the access and mobility management function network element. In this case, in a subsequent process in which signaling exchange is performed between a radio access network and the core network, a radio access network-side function network element can query the network repository function network element for the capability information, and select a corresponding interface function network element based on the capability information, for signaling transmission, thereby ensuring that signaling transmission can be properly performed between the radio access network and the core network.

In another embodiment, the second implementation of the capability information reporting procedure is provided. FIG. 29 is a flowchart of a second implementation of a capability information reporting procedure. The fourth network element is a non-service-oriented interface function network element. The second implementation specifically includes the following steps.

Step S2501: An access and mobility management function network element sends identification information and capability information to an NGAP protocol layer of a core network.

For example, when the access and mobility management function network element is started, the access and mobility management function network element may send an AMF onboarding notification message (AMF onboarding notify) to the NGAP protocol layer of the core network. In this application, the identification information and the capability information of the access and mobility management function network element are configured in the AMF onboarding notification message, and the identification information and the capability information of the access and mobility management function network element are sent to the NGAP protocol layer of the core network by using the AMF onboarding notification message.

Step S2502: The non-service-oriented interface function network element sends a request message to the NGAP protocol layer of the core network.

For example, the request message is an NG interface setup request message (NG setup request), and is used for establishing a communication connection between the non-service-oriented interface function network element and the NGAP protocol layer of the core network.

Step S2503: The non-service-oriented interface function network element receives the identification information and the capability information from the NGAP protocol layer of the core network.

For example, after receiving the NG interface setup request message, the NGAP protocol layer of the core network sends an NG interface setup response message (NG setup response) to the non-service-oriented interface function network element. In this application, the identification information and the capability information of the access and mobility management function network element are configured in the NG interface setup response message, and the identification information and the capability information of the access and mobility management function network element are sent to the NGAP protocol layer of the core network by using the NG interface setup response message.

Step S2504: The non-service-oriented interface function network element stores the identification information and the capability information.

For example, the non-service-oriented interface function network element generates an AMF context based on the identification information and the capability information that are received from the NGAP protocol layer of the core network. For content of the AMF context, refer to Table 1 and the specific description content of step S303 in this application. Details are not described herein again.

Therefore, according to the method provided in this embodiment of the present invention, the non-service-oriented interface function network element obtains the identification information and the capability information of the access and mobility management function network element. In this case, in a subsequent process in which signaling exchange is performed between a radio access network and the core network, a radio access network-side function network element can query the non-service-oriented interface function network element for the capability information, and select a corresponding interface function network element based on the capability information, for signaling transmission, thereby ensuring that signaling transmission can be properly performed between the radio access network and the core network.

In still another embodiment, the third implementation of the capability information reporting procedure is provided. FIG. 30 is a flowchart of a third implementation of a capability information reporting procedure. The fourth network element is a radio network management function network element. The third implementation specifically includes the following steps.

Step S2601: An access and mobility management function network element sends identification information and capability information to an NGAP protocol layer of a core network.

For example, when the access and mobility management function network element is started, the access and mobility management function network element may send an AMF onboarding notification message (AMF onboarding notify) to the NGAP protocol layer of the core network. In this application, the identification information and the capability information of the access and mobility management function network element are configured in the AMF onboarding notification message, and the identification information and the capability information of the access and mobility management function network element are sent to the NGAP protocol layer of the core network by using the AMF onboarding notification message.

Step S2602: A non-service-oriented interface function network element sends a request message to the NGAP protocol layer of the core network.

For example, the request message is an NG interface setup request message (NG setup request), and is used for establishing a communication connection between the non-service-oriented interface function network element and the NGAP protocol layer of the core network.

Step S2603: The non-service-oriented interface function network element receives the identification information and the capability information from the NGAP protocol layer of the core network.

For example, after receiving the NG interface setup request message, the NGAP protocol layer of the core network sends an NG interface setup response message (NG setup response) to the non-service-oriented interface function network element. In this application, the identification information and the capability information of the access and mobility management function network element are configured in the NG interface setup response message, and the identification information and the capability information of the access and mobility management function network element are sent to the NGAP protocol layer of the core network by using the NG interface setup response message.

Step S2604: The radio network management function network element receives the identification information and the capability information from the non-service-oriented interface function network element.

For example, after receiving the identification information and the capability information from the NGAP protocol layer of the core network, the non-service-oriented interface function network element sends an AMF capability report message (AMF N2 capability report) to the radio network management function network element. The AMF capability report message carries the identification information and the capability information. In this way, the radio network management function network element receives the identification information and the capability information by using the AMF capability report message.

Step S2605: The radio network management function network element stores the identification information and the capability information.

For example, the radio network management function network element generates an AMF context based on the identification information and the capability information that are received from the non-service-oriented interface function network element. For content of the AMF context, refer to Table 1 and the specific description content of step S303 in this application. Details are not described herein again.

In addition, after generating the AMF context, the radio network management function network element may send an AMF capability report acknowledgment message (AMF N2 capability report ACK) to the non-service-oriented interface function network element. The AMF capability report acknowledgment message is used to notify the non-service-oriented interface function network element of a status in which the radio network management function network element has stored the identification information and the capability information.

Therefore, according to the method provided in this embodiment of the present invention, the radio network management function network element obtains the identification information and the capability information of the access and mobility management function network element. In this case, in a subsequent process in which signaling exchange is performed between a radio access network and the core network, a radio access network-side function network element can query the radio network management function network element for the capability information, and select a corresponding interface function network element based on the capability information, for signaling transmission, thereby ensuring that signaling transmission can be properly performed between the radio access network and the core network.

In the foregoing embodiments provided in this application, the solutions of the signaling transmission interface compatibility method provided in the embodiments of this application are separately described from a perspective of the network elements and from a perspective of interaction between the network elements. It may be understood that, to implement the foregoing functions, the network elements, for example, the radio network management function network element, the radio resource control network element, the non-service-oriented interface function network element, the domain name system server network element, and the network repository function network element, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 31:
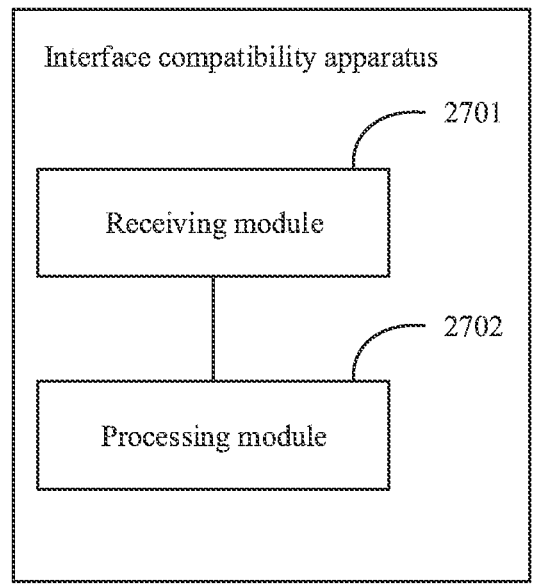
FIG. 31 is a schematic structural diagram of a signaling transmission interface compatibility apparatus according to this application.

For example, when the foregoing network elements implement the corresponding functions by using the software modules, a signaling transmission interface compatibility apparatus may include a receiving module 2701 and a processing module 2702, as shown in FIG. 31.

In an embodiment, the signaling transmission interface compatibility apparatus may be configured to perform an operation of the first network element in FIG. 4. For example, the receiving module 2701 is configured to obtain capability information of an access and mobility management function network element, where the capability information is used to indicate that the access and mobility management function network element has a capability of performing signaling transmission with a radio access network through a target interface function network element; and the processing module 2702 is configured to select the target interface function network element based on the capability information, where the target interface function network element is used for signaling transmission between the access and mobility management function network element and the radio access network.

Therefore, the signaling transmission interface compatibility apparatus provided in this embodiment of the present invention can obtain the capability information of the access and mobility management function network element, and select the corresponding target interface function network element based on the capability information. In this way, the signaling transmission interface compatibility apparatus can perform signaling transmission with the access and mobility management function network element of a core network through the target interface function network element, thereby ensuring that signaling transmission can be properly performed between the radio access network and the core network.

Optionally, the capability information is used to indicate that the access and mobility management function network element has a capability of performing signaling transmission with the radio access network through a non-service-oriented interface function network element, used to indicate that the access and mobility management function network element has a capability of performing signaling transmission with the radio access network through a radio network management function network element, or used to indicate that the access and mobility management function network element has a capability of performing signaling transmission with the radio access network through at least one of a non-service-oriented interface function network element or a radio network management function network element. In this case, the interface compatibility apparatus can select the corresponding target interface function network element based on an indication of the capability information, thereby ensuring that signaling transmission can be properly performed between the radio access network and the core network.

In addition, the target interface function network element may be the non-service-oriented interface function network element, may be the radio network management function network element, or may be either the non-service-oriented interface function network element or the radio network management function network element. Therefore, there may be a plurality of optional manners of the target interface function network element, and deployment can be flexibly performed. This ensures that signaling transmission can be properly performed between the radio access network and the core network in various networking statuses.

Figure 32:
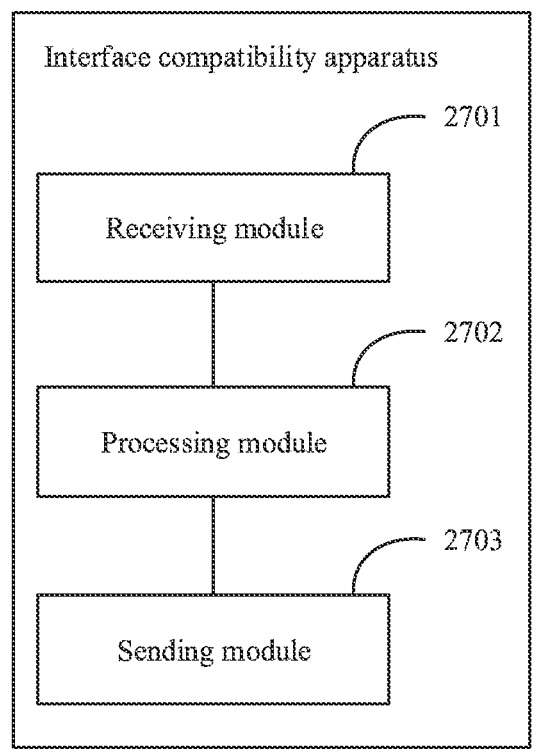
FIG. 32 is a schematic structural diagram of another signaling transmission interface compatibility apparatus according to this application.

Optionally, as shown in FIG. 32, a signaling transmission interface compatibility apparatus provided in this embodiment of the present invention further includes: a sending module 2703, configured to send request information to a second network element. A receiving module 2701 is specifically configured to receive capability information from the second network element.

Optionally, the sending module 2703 is configured to send the request information to the second network element. The receiving module 2701 is further configured to receive identification information of a mobility management function network element from the second network element. A processing module 2702 is further configured to obtain the capability information from a first network element based on the identification information. In this case, the first network element obtains the capability information of the access and mobility management function network element from the second network element. In this way, the first network element can select a target interface function network element based on the capability information, and perform signaling transmission with the access and mobility management function network element of a core network through the target interface function network element, thereby ensuring that signaling transmission can be properly performed between a radio access network and the core network.

Optionally, the sending module 2303 is configured to send the request information to the second network element. The receiving module 2701 is further configured to receive identification information of a mobility management function network element from the second network element. The sending module 2703 is further configured to send the identification information to a third network element. The receiving module 2701 is further configured to receive the capability information from the third network element. In this case, a first network element obtains the capability information of the access and mobility management function network element from the third network element. In this way, the first network element can select a target interface function network element based on the capability information, and perform signaling transmission with the access and mobility management function network element through the target interface function network element, thereby ensuring that signaling transmission can be properly performed between a radio access network and a core network.

Optionally, the third network element is a non-service-oriented interface function network element; the third network element is a non-service-oriented interface function network element or a radio network management function network element; or the third network element is a radio network management function network element. Therefore, there are a plurality of optional manners of the third network element, and deployment can be flexibly performed. This ensures that signaling transmission can be properly performed between the radio access network and the core network in various networking statuses.

Optionally, if the capability information is used to indicate that the access and mobility management function network element has a capability of performing signaling transmission with the radio access network through the non-service-oriented interface function network element, the processing module 2702 is specifically configured to select the non-service-oriented interface function network element as the target interface function network element. Alternatively, if the capability information is used to indicate that the access and mobility management function network element has a capability of performing signaling transmission with the radio access network through the radio network management function network element, the processing module 2702 is further configured to select the radio network management function network element as the target interface function network element. Alternatively, if the capability information is used to indicate that the access and mobility management function network element has a capability of performing signaling transmission with the radio access network through at least one of the non-service-oriented interface function network element or the radio network management function network element, the processor module 2702 is further configured to select the non-service-oriented interface function network element or the radio network management function network element as the target interface function network element. In this case, the first network element can select the corresponding target interface function network element based on an indication of the capability information, thereby ensuring that signaling transmission can be properly performed between the radio access network and the core network.

The second network element is a network repository function network element; the second network element is a domain name system server network element or the radio network management function network element; or the second network element is a domain name system server network element. Therefore, there are a plurality of optional manners of the second network element, and deployment can be flexibly performed. This ensures that signaling transmission can be properly performed between the radio access network and the core network in various networking statuses.

Optionally, the sending module 2703 is further configured to send a user equipment registration request message to the access and mobility management function network element through the target interface function network element. The receiving module 2701 is further configured to receive user equipment context information from the access and mobility management function network element through the target interface function network element. In this case, the first network element performs signaling transmission with the access and mobility management function network element through the target interface function network element. Because the target function network element is selected by the first network element based on the capability information of the access and mobility management function network element, proper signaling transmission between the radio access network and the core network can be ensured.

Optionally, the sending module 2703 is further configured to send a user equipment registration request message to the access and mobility management function network element. The receiving module 2701 is further configured to receive user equipment context information from the access and mobility management function network element. In this case, the first network element, which also serves as the target interface function network element, performs signaling transmission with the access and mobility management function network element. This can ensure proper signaling transmission between the radio access network and the core network.

In addition, the receiving module 2701, the processing module 2702, and the sending module 2703 in the signaling transmission interface compatibility apparatus may further implement another operation or function of the first network element in the foregoing method, and details are not described herein again.

Figure 9:
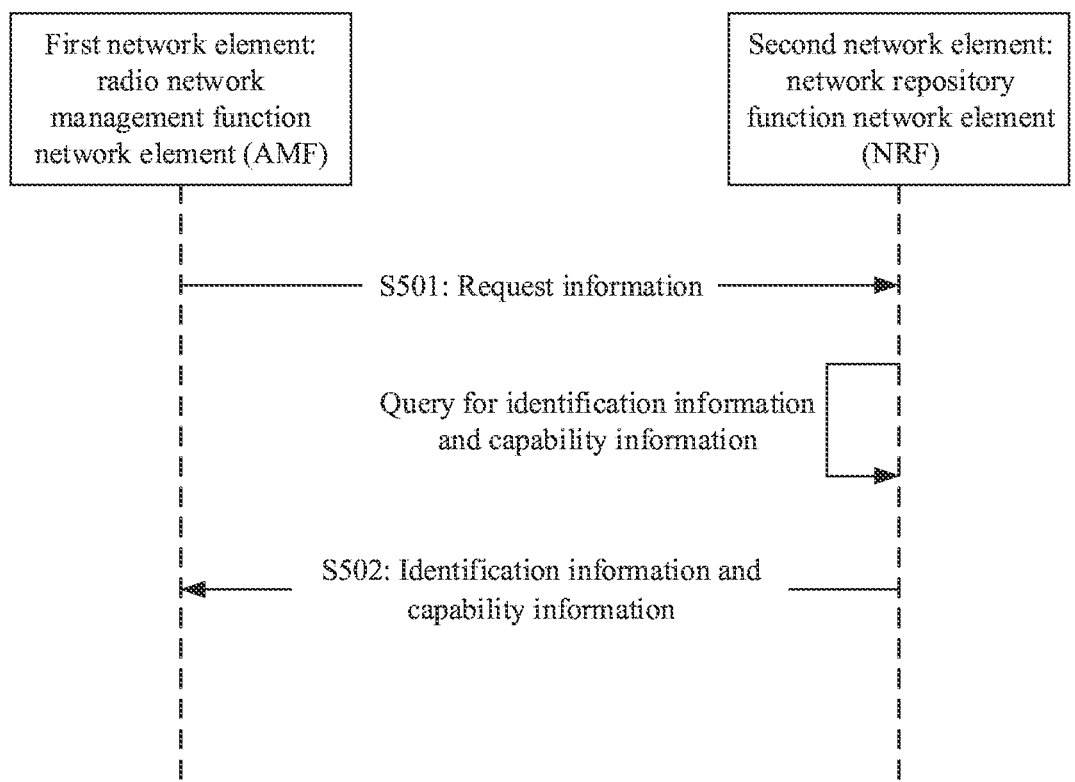
FIG. 9 is a flowchart of a first implementation of obtaining capability information by a first network element from a second network element.

In another embodiment, the signaling transmission interface compatibility apparatus shown in FIG. 32 may be specifically configured to perform an operation of the radio network management function network element in FIG. 9. For example, the sending module 2703 is configured to send request information to a network repository function network element. For example, the request information is an AMF service discovery request message (NF service discovery request), and is used by the network repository function network element to query a usable access and mobility management function network element of a core network. The receiving module 2701 is configured to receive identification information and capability information from the network repository function network element.

Therefore, according to the apparatus in this embodiment of the present invention, the radio network management function network element obtains the capability information of the access and mobility management function network element from the network repository function network element. In this way, the radio network management function network element can select a target interface function network element based on the capability information, and perform signaling transmission with the access and mobility management function network element through the target interface function network element, thereby ensuring that signaling transmission can be properly performed between a radio access network and the core network.

Figure 10:
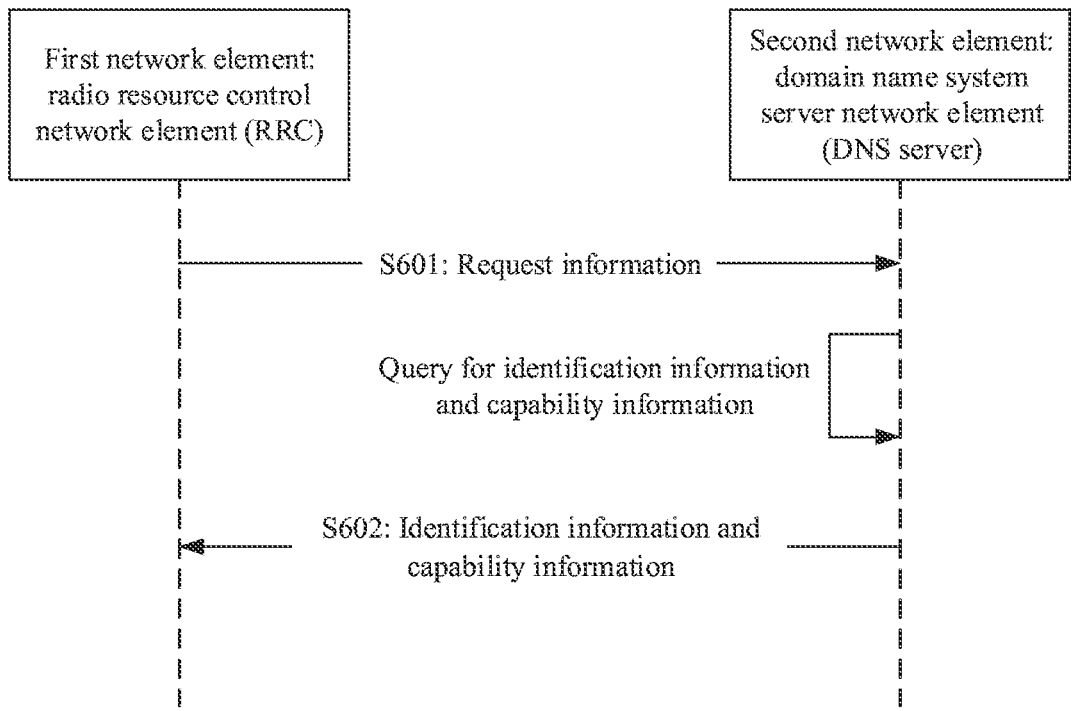
FIG. 10 is a flowchart of a second implementation of obtaining capability information by a first network element from a second network element.

In still another embodiment, the signaling transmission interface compatibility apparatus shown in FIG. 32 may be specifically configured to perform an operation of the radio resource control network element in FIG. 10. For example, the sending module 2703 is configured to send request information to a domain name system server network element. For example, the request information is a DNS query request message (DNS query request), and is used by the domain name system server network element to query user equipment and a usable access and mobility management function network element. The receiving module 2701 is configured to receive identification information and capability information from the domain name system server network element.

Therefore, according to the apparatus in this embodiment of the present invention, the radio resource control network element obtains the capability information of the access and mobility management function network element from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

Figure 11:
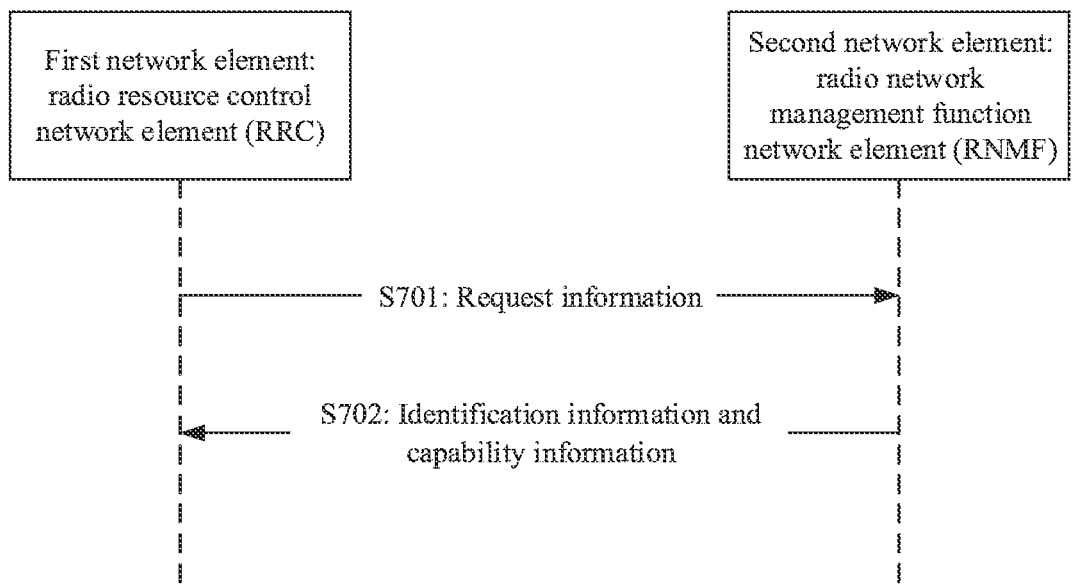
FIG. 11 is a flowchart of a third implementation of obtaining capability information by a first network element from a second network element.

In still another embodiment, the signaling transmission interface compatibility apparatus shown in FIG. 32 may be specifically configured to perform an operation of the radio resource control network element in FIG. 11. For example, the sending module 2703 is configured to send request information to a radio network management function network element. For example, the request information is a UE message direction request, where the UE message direction request carries a message type. For example, the message type may include an uplink non-access stratum (NAS) message and the like. The UE message direction request is generated based on a user equipment registration request message sent by user equipment to the radio resource control network element. The receiving module 2701 is configured to receive identification information and capability information from the radio network management function network element.

Therefore, according to the apparatus in this embodiment of the present invention, the radio resource control network element obtains the capability information of an access and mobility management function network element from the radio network management function network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

Figure 12:
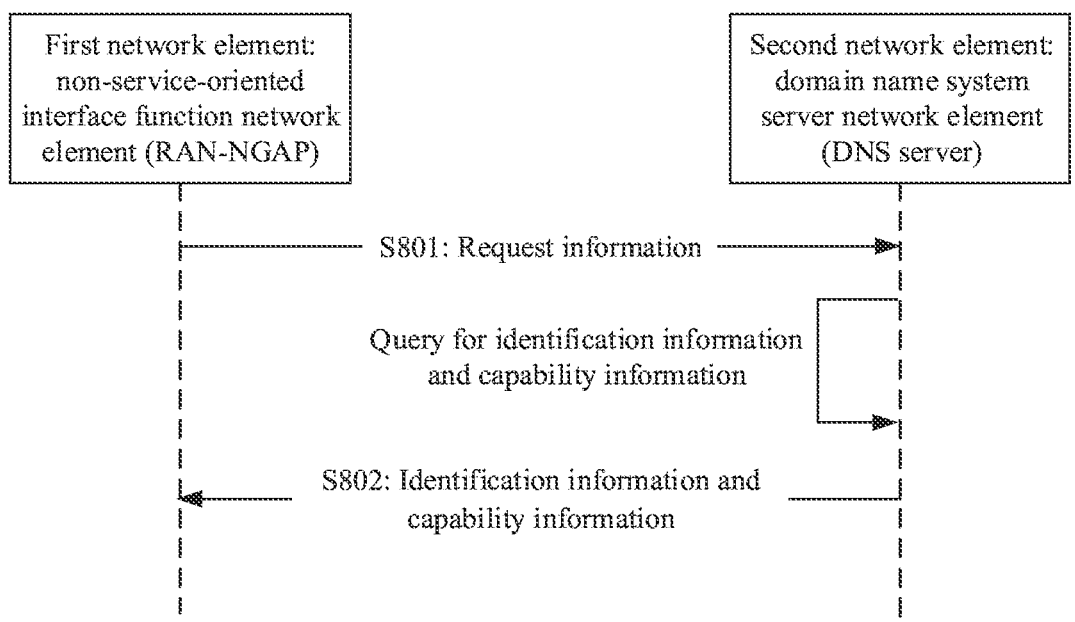
FIG. 12 is a flowchart of a fourth implementation of obtaining capability information by a first network element from a second network element.

In still another embodiment, the signaling transmission interface compatibility apparatus shown in FIG. 32 may be specifically configured to perform an operation of the non-service-oriented interface function network element in FIG. 12. For example, the sending module 2703 is configured to send request information to a domain name system server network element. For example, the request information is a DNS query request message (DNS query request). The receiving module 2701 is configured to receive identification information and capability information from the domain name system server network element. The sending module 2703 is configured to receive the identification information and the capability information from the domain name system server network element.

Therefore, according to the apparatus in this embodiment of the present invention, the non-service-oriented interface function network element obtains the capability information of an access and mobility management function network element from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

Figure 13:
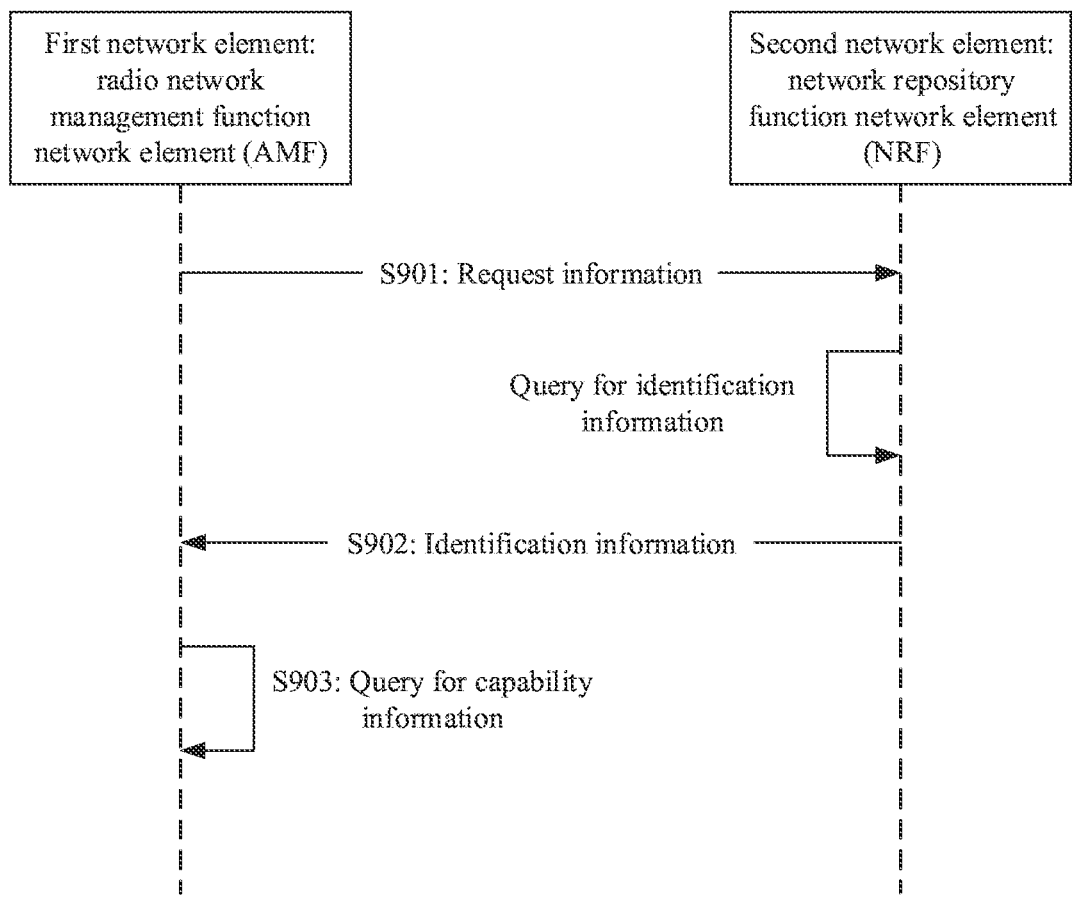
FIG. 13 is a flowchart of a first implementation of obtaining capability information by a first network element from the first network element.

In still another embodiment, the signaling transmission interface compatibility apparatus shown in FIG. 32 may be specifically configured to perform an operation of the radio network management function network element in FIG. 13. For example, the sending module 2703 is configured to send request information to a network repository function network element. For example, the request information is an AMF service discovery request message (NF service discovery request). The receiving module 2701 is configured to receive identification information from the network repository function network element. The processing module 2702 is configured to obtain capability information from the radio network management function network element based on the identification information.

Therefore, according to the apparatus in this embodiment of the present invention, the radio network management function network element obtains, based on the identification information received from the network repository function network element, the capability information of an access and mobility management function network element from an AMF context stored in the radio network management function network element. In this way, the radio network management function network element can select a target interface function network element based on the capability information, and perform signaling transmission with the access and mobility management function network element through the target interface function network element, thereby ensuring that signaling transmission can be properly performed between a radio access network and a core network.

Figure 14:
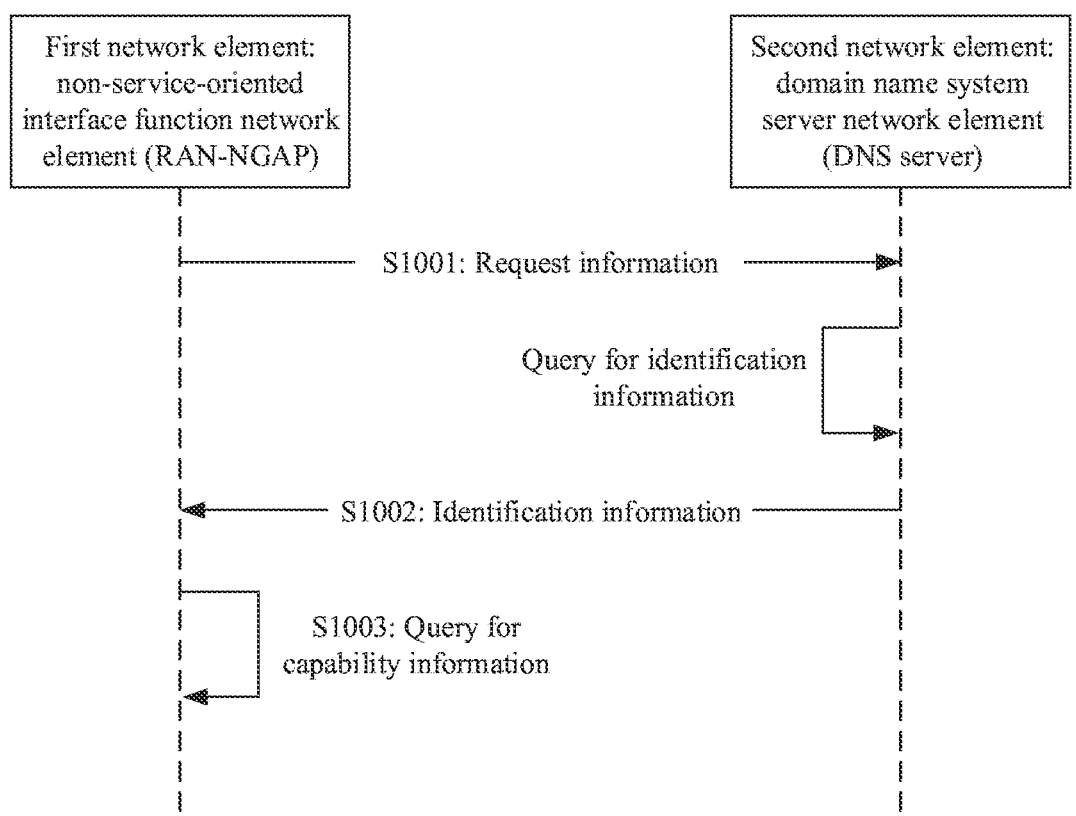
FIG. 14 is a flowchart of a second implementation of obtaining capability information by a first network element from the first network element.

In still another embodiment, the signaling transmission interface compatibility apparatus shown in FIG. 32 may be specifically configured to perform an operation of the non-service-oriented interface function network element in FIG. 14. For example, the sending module 2703 is configured to send request information to a domain name system server network element. For example, the request information is a DNS query request message (DNS query request). The receiving module 2701 is configured to receive identification information from the domain name system server network element. The processing module 2702 is configured to obtain capability information from the non-service-oriented interface function network element based on the identification information.

Therefore, according to the apparatus in this embodiment of the present invention, the non-service-oriented interface function network element obtains, based on the identification information received from a network repository function network element, the capability information of an access and mobility management function network element from an AMF context stored in the non-service-oriented interface function network element. In this way, the non-service-oriented interface function network element can select a target interface function network element based on the capability information, and perform signaling transmission with the access and mobility management function network element through the target interface function network element, thereby ensuring that signaling transmission can be properly performed between a radio access network and a core network.

Figure 15:
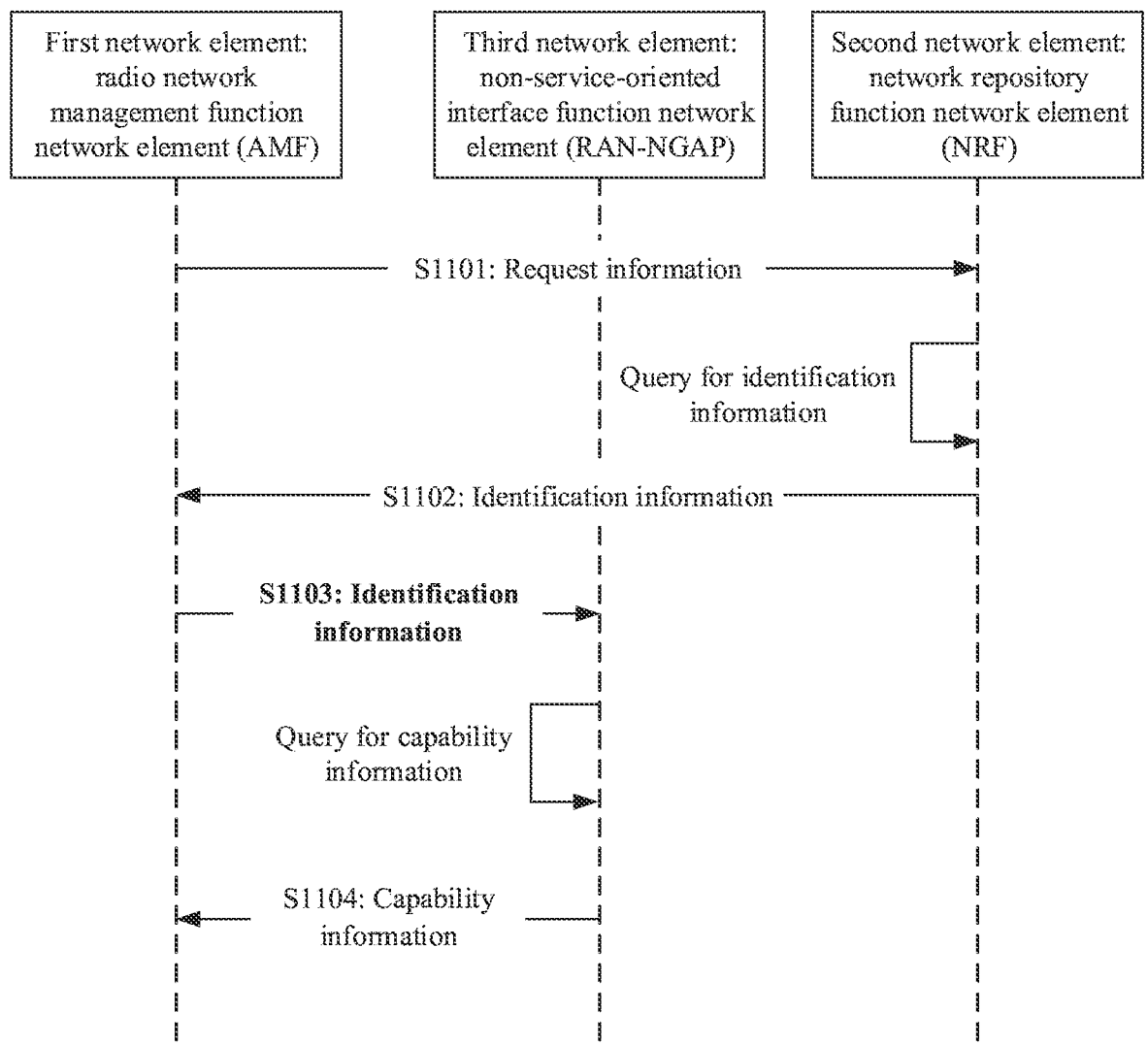
FIG. 15 is a flowchart of a first implementation of obtaining capability information by a first network element from a third network element.

In still another embodiment, the signaling transmission interface compatibility apparatus shown in FIG. 32 may be specifically configured to perform an operation of the radio network management function network element in FIG. 15. For example, the sending module 2703 is configured to send request information to a network repository function network element. For example, the request information is an AMF service discovery request message (NF service discovery request). The receiving module 2701 is configured to receive identification information from the network repository function network element. The sending module 2703 is configured to send the identification information to a non-service-oriented interface function network element. The receiving module 2701 is configured to receive capability information from the non-service-oriented interface function network element.

Therefore, according to the apparatus in this embodiment of the present invention, the radio network management function network element obtains the capability information of an access and mobility management function network element from the non-service-oriented interface function network element based on the identification information received from the network repository function network element. In this way, the radio network management function network element can select a target interface function network element based on the capability information, and perform signaling transmission with the access and mobility management function network element through the target interface function network element, thereby ensuring that signaling transmission can be properly performed between a radio access network and a core network.

Figure 16:
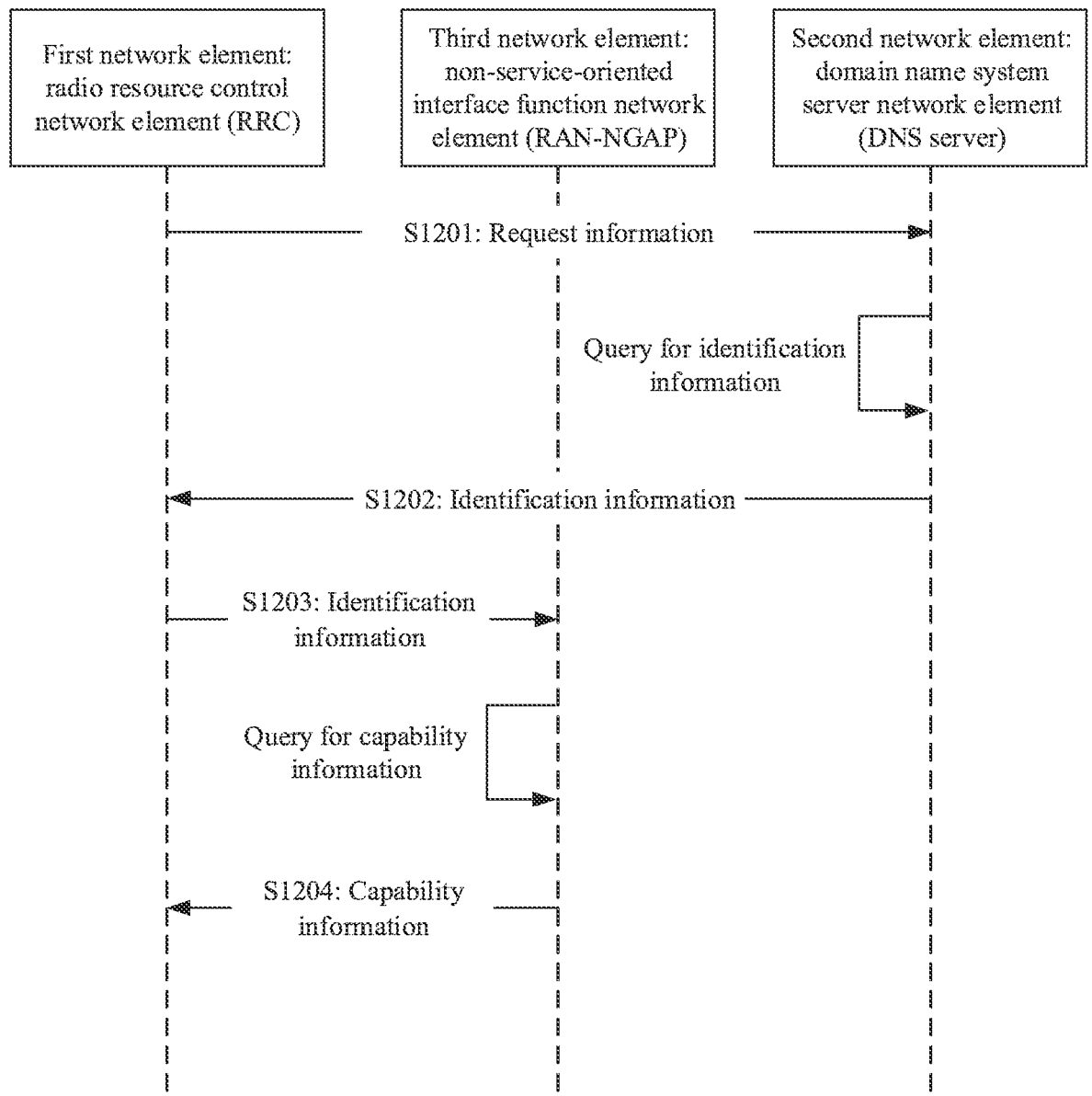
FIG. 16 is a flowchart of a second implementation of obtaining capability information by a first network element from a third network element.

In still another embodiment, the signaling transmission interface compatibility apparatus shown in FIG. 32 may be specifically configured to perform an operation of the radio resource control network element in FIG. 16. For example, the sending module 2703 is configured to send request information to a domain name system server network element. For example, the request information is an AMF service discovery request message (NF service discovery request). The receiving module 2701 is configured to receive identification information from the domain name system server network element. The sending module 2703 is configured to send the identification information to a non-service-oriented interface function network element. The receiving module 2701 is configured to receive capability information from the non-service-oriented interface function network element.

Therefore, according to the apparatus in this embodiment of the present invention, the radio resource control network element obtains the capability information of an access and mobility management function network element from the non-service-oriented interface function network element based on the identification information received from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

Figure 17:
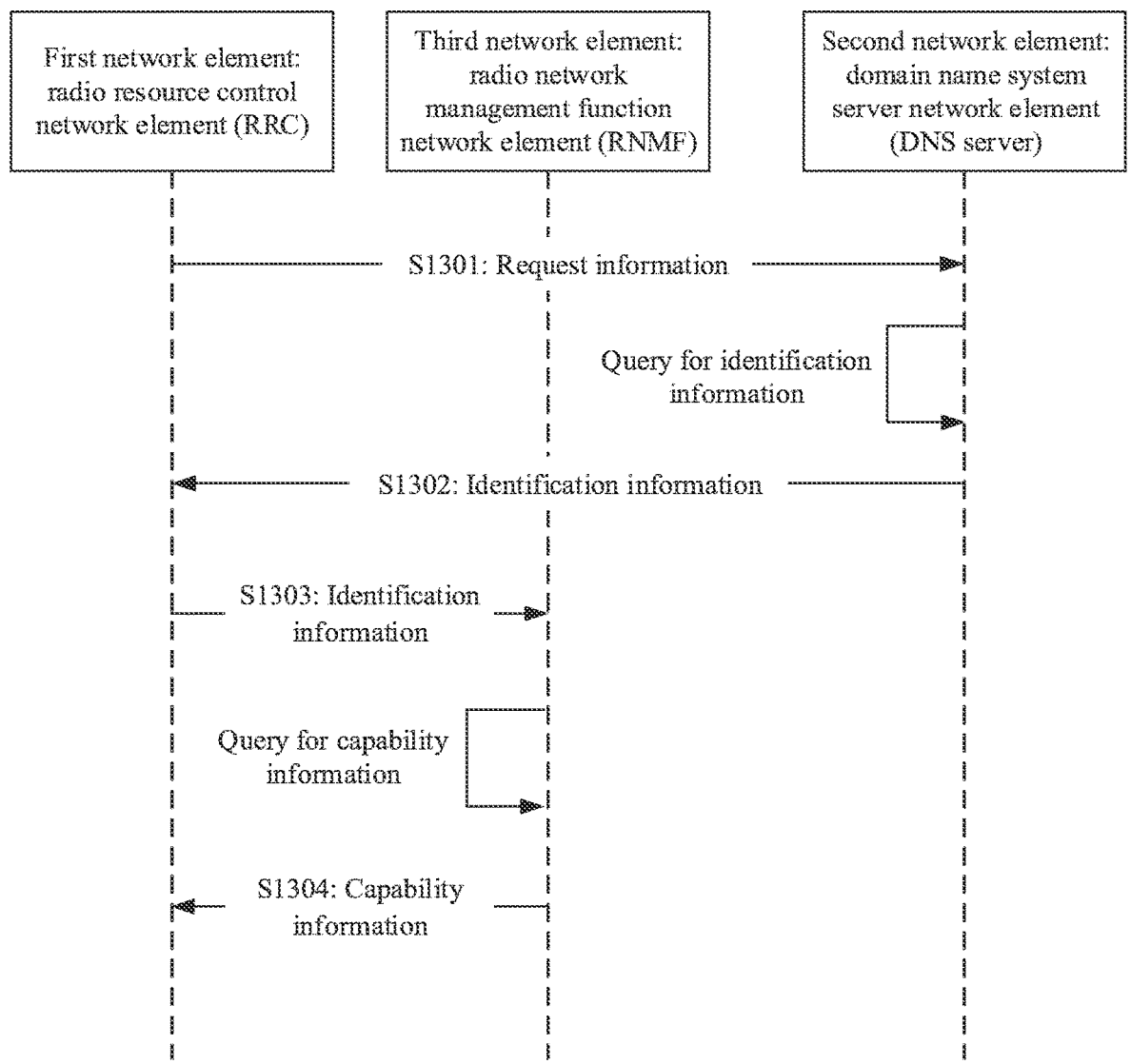
FIG. 17 is a flowchart of a third implementation of obtaining capability information by a first network element from a third network element.

In still another embodiment, the signaling transmission interface compatibility apparatus shown in FIG. 32 may be specifically configured to perform an operation of the radio resource control network element in FIG. 17. For example, the sending module 2703 is configured to send request information to a domain name system server network element. For example, the request information is an AMF service discovery request message (NF service discovery request). The receiving module 2701 is configured to receive identification information from the domain name system server network element. The sending module 2703 is configured to send the identification information to a radio network management function network element. The receiving module 2701 is configured to receive capability information from the radio network management function network element.

Therefore, according to the apparatus in this embodiment of the present invention, the radio resource control network element obtains the capability information of an access and mobility management function network element from the radio network management function network element based on the identification information received from the domain name system server network element. In this way, the radio resource control network element can select a target interface function network element based on the capability information, and perform signaling transmission with the access and mobility management function network element through the target interface function network element, thereby ensuring that signaling transmission can be properly performed between a radio access network and a core network.

Figure 18:
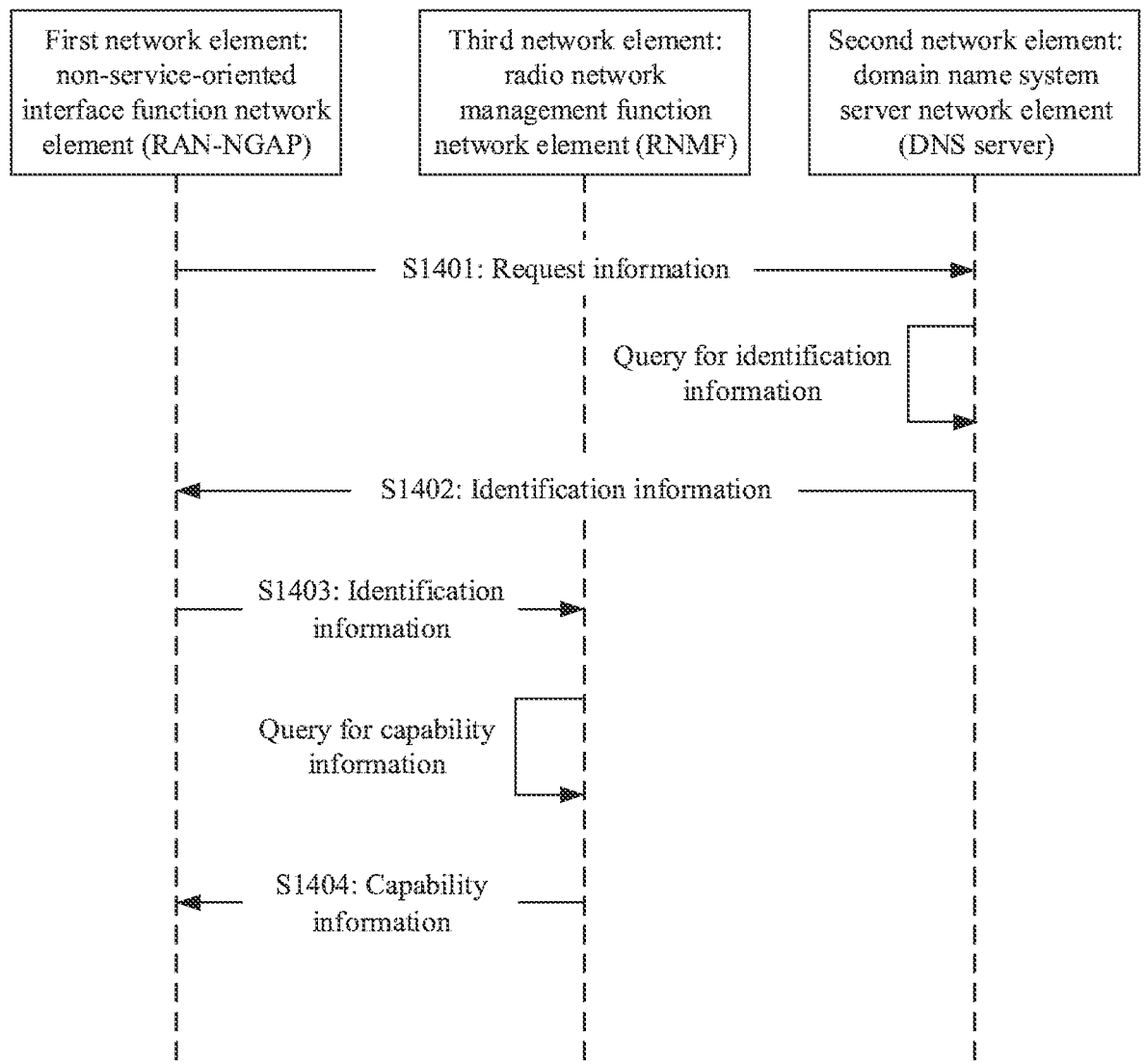
FIG. 18 is a flowchart of a fourth implementation of obtaining capability information by a first network element from a third network element.

In still another embodiment, the signaling transmission interface compatibility apparatus shown in FIG. 32 may be specifically configured to perform an operation of the non-service-oriented interface function network element in FIG. 18. For example, the sending module 2703 is configured to send request information to a domain name system server network element. For example, the request information is a DNS query request message (DNS query request). The receiving module 2701 is configured to receive identification information from the domain name system server network element. The sending module 2703 is configured to send the identification information to a radio network management function network element. The receiving module 2701 is configured to receive capability information from the radio network management function network element.

Therefore, according to the apparatus in this embodiment of the present invention, the non-service-oriented interface function network element obtains the capability information of an access and mobility management function network element from the radio network management function network element based on the identification information received from the domain name system server network element. In this way, the non-service-oriented interface function network element can select a target interface function network element based on the capability information, and perform signaling transmission with the access and mobility management function network element through the target interface function network element, thereby ensuring that signaling transmission can be properly performed between a radio access network and a core network.

In still another embodiment, the signaling transmission interface compatibility apparatus shown in FIG. 31 may be configured to perform an operation of the fourth network element in FIG. 4. For example, the receiving module 2701 is configured to obtain identification information of an access and mobility management function network element and capability information of the access and mobility management function network element.

The processing module 2702 is configured to store the identification information and the capability information.

Therefore, according to the apparatus provided in this embodiment of the present invention, the fourth network element prestores the capability information of the access and mobility management function network element. In this case, in a subsequent process in which signaling exchange is performed between a radio access network and a core network, a radio access network-side function network element can obtain the capability information of the access and mobility management function network element from the fourth network element, and select a corresponding target interface function network element based on the capability information, for signaling transmission, thereby ensuring that signaling transmission can be properly performed between the radio access network and the core network.

Figure 33:
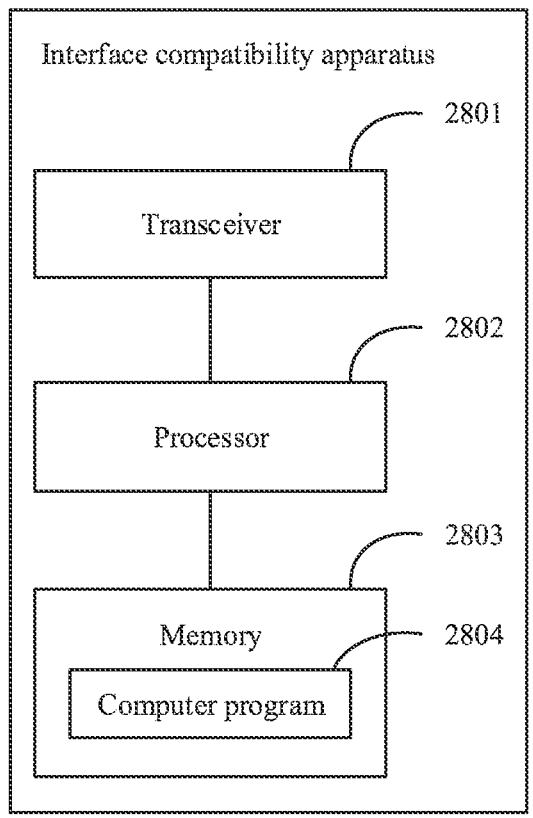
FIG. 33 is a schematic structural diagram of still another signaling transmission interface compatibility apparatus according to this application.

FIG. 33 is another possible schematic structural diagram of a signaling transmission interface compatibility apparatus in the foregoing embodiments. The signaling transmission interface compatibility apparatus includes a transceiver 2801, a processor 2802, and a memory 2803, as shown in FIG. 33. The memory 2803 is configured to be coupled to the processor 2802, and stores a computer program 2804 that is necessary for the signaling transmission interface compatibility apparatus. For example, in an embodiment, the processor 2802 is configured as another operation or function of a first network element. The transceiver 1104 is configured to implement communication between the first network element and a second/third network element. According to the apparatus, the first network element obtains capability information of an access and mobility management function network element, and selects a corresponding target interface function network element based on the capability information. In this way, the first network element can perform signaling transmission with the access and mobility management function network element of a core network through the target interface function network element, thereby ensuring that signaling transmission can be properly performed between a radio access network and the core network.

In another embodiment, the processor 2802 is specifically configured as another operation or function of a fourth network element. The transceiver 1104 is configured to implement communication between the network element, a non-service-oriented interface function network element, an NGAP protocol layer of a core network, and an access and mobility management function network element of the core network. According to the apparatus, the fourth network element prestores capability information of the access and mobility management function network element. In this case, in a subsequent process in which signaling exchange is performed between a radio access network and the core network, a radio access network-side function network element can obtain the capability information of the access and mobility management function network element from the fourth network element, and select a corresponding target interface function network element based on the capability information, for signaling transmission, thereby ensuring that signaling transmission can be properly performed between the radio access network and the core network.

Figure 34:
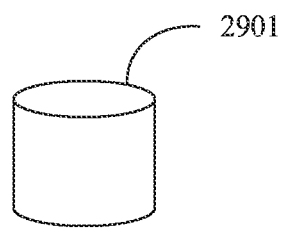
FIG. 34 is a schematic diagram of a computer-readable storage medium according to this application.

As shown in FIG. 34, an embodiment of this application further provides a computer-readable storage medium 2901. The computer-readable storage medium stores an instruction. When the instruction is run on a computer, the computer is enabled to perform the methods in the foregoing aspects. The storage medium 2901 may be a RAM memory, a flash memory, a ROM memory, an EPROM memory, an EEPROM memory, a register, a hard disk, a removable hard disk, a CD-ROM, or a storage medium of any other form. In this case, a radio access network-side function network element selects a corresponding target interface function network element based on capability information, for signaling transmission, thereby ensuring that signaling transmission can be properly performed between a radio access network and a core network.

An embodiment of this application further provides a computer program product including an instruction. When the computer program product runs on a computer, the computer is enabled to perform the methods in the foregoing aspects. In this case, a radio access network-side function network element selects a corresponding target interface function network element based on capability information, for signaling transmission, thereby ensuring that signaling transmission can be properly performed between a radio access network and a core network.

Figure 35:
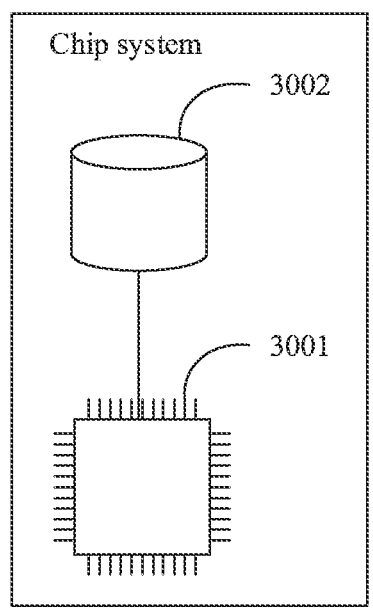
FIG. 35 is a schematic diagram of a chip system according to this application.

An embodiment of this application further provides a chip system. FIG. 35 is a schematic structural diagram of the chip system. The chip system includes a processor 3001, and is configured to support the apparatus or user equipment in implementing functions in the foregoing aspects, for example, generating or processing information in the foregoing methods. In a possible design, the chip system further includes a memory 3002. The memory is configured to store a program instruction and data that are necessary for a signaling transmission interface compatibility apparatus. The chip system may include a chip, or may include a chip and another discrete component. In this case, a radio access network-side function network element selects a corresponding target interface function network element based on capability information, for signaling transmission, thereby ensuring that signaling transmission can be properly performed between a radio access network and a core network.

A controller/processor configured to perform the signaling transmission interface compatibility apparatus in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various examples of logical blocks, modules, and circuits described with reference to content disclosed in this application. The processor may be a combination of processors implementing a computing function, for example, a combination of one or more microprocessors, or a combination of a DSP and a microprocessor.

Methods or algorithm steps described in combination with the content disclosed in this application may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a radio access network device. Certainly, the processor and the storage medium may alternatively exist in the radio access network device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method, comprising:
    obtaining, by a first network element, capability information of an access and mobility management function network element, wherein the capability information indicates that the access and mobility management function network element is capable of performing signaling transmission with a radio access network through a target interface function network element, wherein the obtaining the capability information comprises:
        sending, by the first network element, request information to a second network element; and
        receiving, by the first network element, the capability information from the second network element; and
    selecting, by the first network element, the target interface function network element based on the capability information, wherein the target interface function network element is used for signaling transmission between the access and mobility management function network element and the radio access network.

2. The method according to claim 1, wherein the receiving the capability information comprises:
    receiving, by the first network element, identification information of the mobility management function network element from the second network element; and
    obtaining, by the first network element, the capability information from the first network element based on the identification information.

3. The method according to claim 1, wherein the receiving the capability information comprises:
    receiving, by the first network element, identification information of the mobility management function network element from the second network element;
    sending, by the first network element, the identification information to a third network element; and
    receiving, by the first network element, the capability information from the third network element.

4. The method according to claim 3,
    wherein the first network element is a radio network management function network element, and the third network element is a non-service-oriented interface function network element,
    wherein the first network element is a radio resource control network element, and the third network element is the non-service-oriented interface function network element or the radio network management function network element, or
    wherein the first network element is the non-service-oriented interface function network element, and the third network element is the radio network management function network element.

5. The method according to claim 4, wherein the selecting the target interface function network element based on the capability information comprises:
    if the capability information indicates that the access and mobility management function network element is capable of performing signaling transmission with the radio access network through the non-service-oriented interface function network element, selecting, by the first network element, the non-service-oriented interface function network element as the target interface function network element;
    if the capability information indicates that the access and mobility management function network element is capable of performing signaling transmission with the radio access network through the radio network management function network element, selecting, by the first network element, the radio network management function network element as the target interface function network element; or
    if the capability information indicates that the access and mobility management function network element is capable of performing signaling transmission with the radio access network through at least one of the non-service-oriented interface function network element or the radio network management function network element, selecting, by the first network element, the non-service-oriented interface function network element or the radio network management function network element as the target interface function network element.

6. The method according to claim 1, further comprising:
    sending, by the first network element, a user equipment registration request message to the access and mobility management function network element through the target interface function network element; and receiving, by the first network element, user equipment context information from the access and mobility management function network element through the target interface function network element.

7. The method according to claim 1, further comprising:

sending, by the first network element, a user equipment registration request message to the access and mobility management function network element; and receiving, by the first network element, user equipment context information from the access and mobility management function network element.

8. The method according to claim 3, wherein the first network element is a radio network management function network element, and the second network element is a network repository function network element, wherein the first network element is a radio resource control network element, and the second network element is a domain name system server network element or the radio network management function network element, or wherein the first network element is a non-service-oriented interface function network element, and the second network element is the domain name system server network element.

9. An apparatus, comprising:

at least one processor; and a non-transitory computer readable storage medium storing programming for execution by the at least one processor, the programming including instructions to cause the apparatus to perform operations including:

obtaining capability information of an access and mobility management function network element, wherein the capability information indicates that the access and mobility management function network element is capable of performing signaling transmission with a radio access network through a target interface function network element, wherein the obtaining the capability information comprises:

sending request information to a second network element; and receiving the capability information from the second network element; and selecting the target interface function network element based on the capability information, wherein the target interface function network element is used for signaling transmission between the access and mobility management function network element and the radio access network.

10. The apparatus according to claim 9, wherein the receiving the capability information comprises:

receiving identification information of the mobility management function network element from the second network element; and obtaining the capability information from a first network element based on the identification information.

11. The apparatus according to claim 9, wherein the receiving the capability information comprises:

receiving identification information of the mobility management function network element from the second network element;

sending the identification information to a third network element; and receiving the capability information from the third network element.

12. The apparatus according to claim 11, wherein the third network element is a non-service-oriented interface function network element, wherein the third network element is the non-service-oriented interface function network element or a radio network management function network element, or wherein the third network element is the radio network management function network element.

13. The apparatus according to claim 12, wherein the selecting the target interface function network element based on the capability information comprises:

if the capability information indicates that the access and mobility management function network element is capable of performing signaling transmission with the radio access network through the non-service-oriented interface function network element, selecting the non-service-oriented interface function network element as the target interface function network element;

if the capability information indicates that the access and mobility management function network element is capable of performing signaling transmission with the radio access network through the radio network management function network element, selecting the radio network management function network element as the target interface function network element; or if the capability information indicates that the access and mobility management function network element is capable of performing signaling transmission with the radio access network through at least one of the non-service-oriented interface function network element or the radio network management function network element, selecting the non-service-oriented interface function network element or the radio network management function network element as the target interface function network element.

14. The apparatus according to claim 9, the operations further comprising:

sending a user equipment registration request message to the access and mobility management function network element through the target interface function network element; and receiving user equipment context information from the access and mobility management function network element through the target interface function network element.

15. The apparatus according to claim 9 the operations further comprising:

sending a user equipment registration request message to the access and mobility management function network element; and receiving user equipment context information from the access and mobility management function network element.

16. The apparatus according to claim 9, wherein the second network element is a network repository function network element;

the second network element is a domain name system server network element or a radio network management function network element; or wherein the second network element is the domain name system server network element.

17. A non-transitory computer-readable storage medium having instructions stored thereon that, when executed by a first network element, cause the first network element to perform operations, the operations comprising:

obtaining capability information of an access and mobility management function network element, wherein the capability information indicates that the access and mobility management function network element is capable of performing signaling transmission with a radio access network through a target interface function network element, wherein the obtaining the capability information comprises:
  sending request information to a second network element; and
  receiving the capability information from the second network element; and
selecting the target interface function network element based on the capability information, wherein the target interface function network element is used for signaling transmission between the access and mobility management function network element and the radio access network.

* * * * *